United States Patent
Murphy et al.

(10) Patent No.: US 8,700,555 B1
(45) Date of Patent: *Apr. 15, 2014

(54) SYSTEMS AND METHODS FOR PAIRING OF A SEMANTIC NETWORK AND A KNOWLEDGE SHARING REPOSITORY

(71) Applicant: Semantic Research, Inc., San Diego, CA (US)

(72) Inventors: Timothy Andrew Murphy, Bowie, MD (US); Joseph Faletti, San Diego, CA (US)

(73) Assignee: Semantic Research, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/673,647

(22) Filed: Nov. 9, 2012

Related U.S. Application Data

(63) Continuation of application No. 12/436,052, filed on May 5, 2009, now Pat. No. 8,332,345.

(60) Provisional application No. 61/050,588, filed on May 5, 2008.

(51) Int. Cl.
*G06F 17/00* (2006.01)
*G06N 5/02* (2006.01)

(52) U.S. Cl.
USPC .......................................................... 706/50

(58) Field of Classification Search
None
See application file for complete search history.

(56) References Cited

U.S. PATENT DOCUMENTS

| | | | |
|---|---|---|---|
| 8,332,345 B1 * | 12/2012 | Murphy et al. | 706/50 |
| 8,442,940 B1 * | 5/2013 | Faletti et al. | 707/610 |
| 2004/0230572 A1 | 11/2004 | Omoigui | |
| 2006/0004703 A1 | 1/2006 | Spivack et al. | |
| 2007/0038610 A1 | 2/2007 | Omoigui | |
| 2010/0070448 A1 | 3/2010 | Omoigui | |
| 2010/0100546 A1 | 4/2010 | Kohler | |

OTHER PUBLICATIONS

U.S. Appl. No. 12/621,478 Non-Final Office Action dated Jun. 20, 2012.
Witte et al. "Connecting Wikis and Natural Language Processing Systems", Proceedings of the 2007 International Symposium on Wikis, pp. 165-176, Oct. 2007.
Witte et al. "A Semantic Wiki Approach to Cultural Heritage Data Management", Proceeding of LREC Workshop on Language Technology for Cultural Heritage Data, Jun. 2008.
Kiryakov et al. "Semantic Annotation, Indexing, and Retrieval", Onotext Lab, Sirma AI EOOD, 138 Tsarigradsko Shose, Sofia 1784, Bulgaria.
U.S. Appl. No. 12/436,052 Non-Final Office Action dated Jan. 12, 2012.

* cited by examiner

*Primary Examiner* — Michael B Holmes
(74) *Attorney, Agent, or Firm* — Cooley LLP

(57) ABSTRACT

Systems and methods for facilitating pairing of semantic networks with knowledge sharing repositories, such as wikis, are described. Information from a semantic network may be transferred to a knowledge sharing repository, and either automatically or manually updated based on changes in the semantic network information. Likewise, information in a knowledge sharing repository may be transferred to a semantic network and automatically or manually updated based in changes in the knowledge sharing repository.

44 Claims, 22 Drawing Sheets

Key Entities in a Semantica® Network

Traditional Semantic Network
(PRIOR ART)

Key Entities in a Semantica® Network

Example Implementation of a Knowledge Sharing Repository and Corresponding Features Example Entity Page from Wikipedia Knowledge Sharing Repository
For Winchester Rifle (Capture of Page 1 of 8)

Winchester rifle - Wikipedia, the free encyclopedia　　　　　　　　　　　　Page 2 of 8

Wesson.

It was originally manufactured by the Volcanic Repeating Arms Company, which was later reorganized into the New Haven Arms Company, its largest stockholder being Oliver Winchester. The Volcanic rifle used a form of caseless ammunition and had only limited success. Wesson had also designed an early form of rimfire cartridge which was subsequently perfected by Benjamin Tyler Henry.

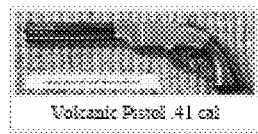

Volcanic Pistol .41 cal

Henry also supervised the redesign of the rifle to use this new rimfire ammunition, retaining only the general form of the breech mechanism and the tubular magazine of the Volcanic. This became the Henry rifle of 1860, which was manufactured by the New Haven Arms Company and was used in considerable numbers by certain Union Army units in the American Civil War.

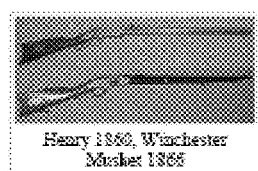

Henry 1860, Winchester Musket 1866

Development

After the war, Oliver Winchester continued to exercise control of the New Haven Arms Company, renaming it the Winchester Repeating Arms Company. This company modified and improved the basic design of the Henry rifle, creating the first Winchester rifle: the Model 1866. It retained the .44 Henry rimfire cartridge, was built on a brass frame, and had an improved magazine and a wooden forearm. In 1873 Winchester introduced the steel-framed Model 1873 chambering the more potent .44-40 centerfire cartridge. In 1876, in a bid to compete with the powerful single-shot rifles of the time, Winchester brought out the Model 1876 (*Centennial Model*).

While it chambered more powerful cartridges than the 1866 and 1873 models, the toggle link action was not strong enough for the popular rounds used in Sharps or Remington single-shot rifles.

From 1883, John Moses Browning worked in partnership with Winchester, designing a series of rifles and shotguns, most notably the lever-action Winchester Model 1886, Winchester Model 1892, Winchester Model 1894, and Winchester Model 1895 rifles, along with the lever-action Winchester Model 1887 shotgun and the pump-action Winchester Model 1893 and Winchester Model 1897 shotguns.

Winchester 73 toggle-link action

Winchester Lever-Action Repeating Rifles

Winchester Model 1866

The original Winchester rifle- the Winchester Model 1866- was famous for its rugged construction and lever-action mechanism that allowed the rifleman to fire a number of shots before having to reload: hence the term, "repeating rifle." Originally chambered in the rimfire .44 Henry, the Model 1866 was nicknamed the "Yellowboy" because of its "brass" receiver. In reality the receiver was made of a bronze-alloy called "Gunmetal".

Winchester Model 1873

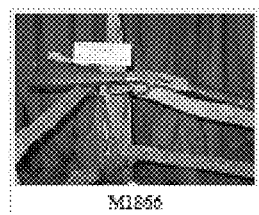

M1866

Fig. 4B
Example Entity Page from Wikipedia Knowledge Sharing Repository
For Winchester Rifle (Capture of Page 2 of 8)

Winchester rifle - Wikipedia, the free encyclopedia
Page 3 of 8

One of the most successful, and certainly one of the most famous Winchester rifles was the Winchester Model 1873, originally chambered for the .44-40 cartridge, although it was later produced in .38-40 and .32-20, all of which also became popular handgun cartridges of the day. Having a common centerfire cartridge in both revolvers and rifles allowed the owner to carry two firearms, but only one type of ammunition. Interestingly, the original Model 1873 was never offered in the military standard .45 Colt cartridge; although a number of modern reproductions of the rifle are chambered for the round. There was a limited number (approximately 19,000) of 1873 Winchesters manufactured in .22 rimfire caliber, which lacked the loading gate on the right side of the receiver. The Winchester Model 1873 was produced in such quantities that they became a common sight in the American West, leading to the rifle being nicknamed *"The Gun that Won the West"* on account of its prevalence and versatility.

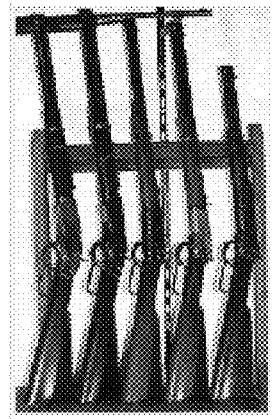

Left to right Carbines two 1873/1894/92/Trapper 92

Winchester Model 1876

The Winchester Model 1876 was a heavier-framed rifle than the Model 1866 or Model 1873, and was the first to be chambered for full-powered centerfire rifle cartridges, as opposed to rimfire cartridges or handgun-sized centerfire rounds. It was introduced to celebrate the American Centennial, and earned a reputation as a durable and powerful hunting rifle. Originally chambered for the new .45-75 WCF cartridge (designed to replicate the .45-70 Gov't ballistics in a shorter case), versions in .40-60, .45-60 and .50-90 Express followed; the '76 in the latter chambering is the only repeater known to have been used in any numbers by the professional buffalo hunters.[1] The Canadian Mounties also used the '76 as a standard long arm for many years. Theodore Roosevelt used an engraved, pistol-gripped half-magazine '76 during his early hunting expeditions in the West and praised it.

Winchester Model 1886

The Model 1886 continued the trend towards chambering heavier rounds, and had a considerably stronger action than the toggle-link Model 1876. It was designed by John Moses Browning, who had a long and profitable relationship with Winchester from the 1880s to the early 1900s. In many respects the Model 1886 was a true American express rifle, as it could be chambered in the more powerful black powder cartridges of the day, such as the .45-70 Government (chambering a rifle for the popular .45-70 had been a goal of Winchester for some time). The 1886 proved capable of handling not merely the .45 Gov't but also the huge .45-90 and .50-110 Express "buffalo" cartridges,[2] and in 1903 was chambered for the smokeless .33 WCF. In 1935 Winchester introduced a slightly modified M1886 as the Model 71, chambered for the very powerful .348 Winchester cartridge.

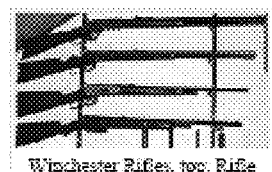

Winchester Rifles, top: Rifle 73/86/92 Take-down/03 Self Loading

Winchester Model 1892

Winchester returned to its roots with the Model 1892, which, like the first lever-action guns, was primarily chambered for shorter, lower-pressure handgun rounds. The Model 1892, however, incorporates a much stronger Browning action (based on the larger

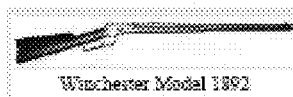

Winchester Model 1892 http://en.wikipedia.org/wiki/Winchester_Rifle
5/4/2009

Fig. 4C
Example Entity Page from Wikipedia Knowledge Sharing Repository
For Winchester Rifle (Capture of Page 3 of 8)

Fig. 4D
Example Entity Page from Wikipedia Knowledge Sharing Repository
For Winchester Rifle (Capture of Page 4 of 8)

400

Winchester rifle - Wikipedia, the free encyclopedia                                    Page 5 of 8

The 9422 action design was original and extremely reliable. The feed system handled the cartridge from the magazine to the breech face by its rim, and the slide cammed the rear of the breechblock up into the locking recess. A concealed polymer buffer above the breech gave a firm-feeling lockup and a very positive unlocking motion.

412

The 9422 had worldwide appeal to customers raised on 'westerns' and to those looking for a fun and historic way to introduce their children to shooting. Over the course of production a higher finished model called the 9422 XTR, a .17 rimfire model, and several commemorative models were offered. Production ended in 2005. [4]

Winchester Model 1885 Single Shot Rifle

In 1885 Winchester entered the single-shot market with the Model 1885 rifle, which John Browning had designed in 1878 (the beginning of the fruitful 20-year Winchester-Browning collaboration). The Winchester Single Shot, known to most shooters as either the "Low-wall" or "High-wall" depending on model, but officially marketed by Winchester as the Single Shot Rifle, was produced to satisfy the demands of the growing sport of "Match Shooting", which opened at Creedmoor, New York, on June 21, 1872. Target/Match shooting was extremely popular in the US from about 1871 until about 1917, enjoying a status similar to golf today, and the Winchester company, which had built its reputation on repeating firearms, had in 1885 challenged the single shot giants of Sharps, Remington, Stevens, Maynard, Ballard et al, not only entering the competition, but excelling at it, with Major Ned H. Roberts (inventor of the .257 Roberts cartridge) describing the Model 1885 Single Shot as "...the most reliable, strongest, and altogether best single shot rifle ever produced."[5] Winchester produced nearly 140,000 Single Shot rifles from 1885 to 1920, and it was found that the Model 1885 had been built with one of the strongest falling block actions known at that time. To satisfy the needs of the shooting and hunting public, the Model 1885 Single Shot was eventually produced in more calibers than any other Winchester rifle. Winchester also produced a large number of Single Shots in .22 Short for the US Army as a marksmanship training rifle, the "Winder musket." In 2005, after a break of 85 years, the Winchester Company reproduced a "Limited Series" of their Winchester Single shot rifles, in both 19th and 20th century calibers. The 21st century Winchester Single Shot rifles are built with the latest technology and modern steels, enabling them to fire modern smokeless cartridges.

Winchester Bolt Action Rifles

Winchester lever action rifles remained the most popular in the US through WWI and the interwar period. However, advances in the development of bolt action rifles made them increasingly desirable. These new rifles, such as the Mauser Gewehr 98 and M1903 Springfield, could chamber pointed "Spitzer" bullets, which lever action rifles with a tube magazine could not. Bolt actions as developed by Mauser and other military manufacturers had front locking lugs which stabilized the cartridge head very well, and allowed for unprecedented accuracy. Bolt actions were simpler and cheaper to manufacture than high-power leverguns like Winchester's 1886 and 1895 models.

In response to the increasing competition from these bolt-action rifles, Winchester introduced the Winchester Model 54 in 1925. This was not Winchester's first bolt rifle (that distinction belonged to the Winchester-Hotchkiss rifle of 1878), but it was by far their most successful. It was based on the Mauser Gewehr 98 design, but with modifications and popular North American chamberings such as .30-06 which made it more appealing to American hunters than were the European imports or sporterised military rifles. The famed Model 70 was developed from the Model 54, which it replaced in 1936. The Model 70, often dubbed the "rifleman's rifle,"[6] was produced continuously at New Haven (except during WWII) until 2006, and production has resumed at FN Herstal's plant in Columbia, South Carolina.

http://en.wikipedia.org/wiki/Winchester_Rifle                                          5/4/2009

Fig. 4E
Example Entity Page from Wikipedia Knowledge Sharing Repository
For Winchester Rifle (Capture of Page 5 of 8)

Winchester rifle - Wikipedia, the free encyclopedia                    400                    Page 6 of 8

In 1920, Winchester introduced a non-Mauser bolt-action design, the .22-caliber Model 52 target rifle, which from its inception and for years thereafter was the world's reference standard smallbore match rifle.[7]

Winchester Self-Loading Rifles

Winchester Models 1903 and 63

The Winchester Model 1903 was the first commercially available self-loading .22 rimfire caliber in the US. Designed by T.C. Johnson, the Model 1903 was chambered for the unique .22 Winchester Automatic cartridge. In later years, the Model 1903 moniker was shortened to Model 03, and following a partial redesign in the 1930's, was renamed the Model 63.

Winchester Models 1905, 1907, and 1910

The early centerfire Winchester self-loading series of rifles began with the Model 1905, chambered for the .32SL and .35SL cartridges. Following a demand for a higher-powered self-loading rifle, the Models 1907 and 1910 were introduced along with their respective cartridges, the .351SL and .401SL.[8]

Shotguns

Winchester Model 1887/1901

The Winchester Model 1887 was the first successful repeating shotgun design, developed by John Browning and produced by Winchester from 1887-1920. Browning felt that a pump-action would be much more appropriate for a repeating shotgun, but as Winchester was primarily a lever-action firearms company they felt that their new shotgun must also be a lever-action for reasons of brand recognition. The M1887 was chambered for 12ga black powder shotshells, and after the switch to smokeless powder at the end of the 19th Century, the M1901 was introduced, being chambered for 10ga smokeless shells. Although a technically sound gun design, the market for lever-action shotguns waned considerably after the introduction of the Winchester 1897 and other contemporary pump-action shotguns; modern reproductions of the gun have been manufactured by Norinco in China, ADI Ltd. in Australia and Chiappa Firearms in Italy.

Winchester Model 1893/1897

Another Browning design, the Winchester Model 1893 (and later Model 1897) was one of the first successful pump-action shotgun designs, being introduced in 1893 and remaining in production until the mid 1950s. Unusual for a repeating shotgun, the Model 1897 could be taken apart for easier carriage/storage, and was available in a variety of barrel lengths from 20in to 36in. During World War I it was issued as a trench gun, with short barrel, heat shield and M1917 bayonet.

Winchester Model 1912

Designed by T.C. Johnson as a hammerless modification of the Model 1897, the Model 1912 (later re-dubbed the Model 12) was one of the most successful pump shotguns ever made, with nearly 2 million produced before its cancellation in 1963. Like the Model 1897 it came in take-down form, and likewise was issued in trench gun and combat versions during both World Wars, Korea and Vietnam. The Model 12 was popular with the military, law enforcement, hunters, and sporting clay competitors, the latter regarding it as having superior balance and "point" among pump-actions.

http://en.wikipedia.org/wiki/Winchester_Rifle                                     5/4/2009

Fig. 4F
Example Entity Page from Wikipedia Knowledge Sharing Repository
For Winchester Rifle (Capture of Page 6 of 8)

Winchester rifle - Wikipedia, the free encyclopedia      Page 7 of 8

400

1964 Changes

412 — In the mid-to late 1950's, Winchester saw a management change which led to an extensive and extremely controversial [9] redesign of their firearms in 1964. This is regarded by many[10] as the year the "real" Winchester ceased to be, and consequently "pre-'64" rifles command higher prices than those made afterwards. Winchester itself went on to have a troubled future as competition from both the US and abroad began to decrease its sales. Although in the 1970's the company attempted to recover its reputation by bringing out the well-received SuperX-1 semiautomatic shotgun, produced along pre-1964 lines, the cost of manufacture again proved unsustainable. In 1980, the company was split into parts and sold off. The name "Winchester" remained with the ammunition making side of the company, and this branch continues to be profitable. The arms making side and New Haven facilities went to U.S. Repeating Arms, which struggled to keep the company going under a variety of owners and management teams. It finally announced plans to close the New Haven facility, the producers of the Model 1894, in 2006.

On August 15, 2006, Olin Corporation, owner of the Winchester trademarks, announced that it had entered into a new license agreement with Browning to make Winchester brand rifles and shotguns, though not at the closed Winchester plant in New Haven. Browning, based in Morgan, Utah, and the former licensee, U.S. Repeating Arms Company, are both subsidiaries of FN Herstal. In 2008 FN 418 — Herstal announced plans to produce Model 70 rifles at its plant in Columbia, SC.

See also

- Winchester Repeating Arms Company
- List of Winchester Models
- John Browning
- Benjamin Tyler Henry
- Henry rifle
- List of rifle cartridges
- Mare's Leg
- Single-shot
- Oliver Winchester
- Winchester Model 70

420 — - Antique guns

References

1. ^ "The Winchester Model 1876 Rifle" (http://www.bar-w.com/1876v04.html). Bar-w.com. http://www.bar-w.com/1876v04.html. Retrieved on 2008-12-26.
2. ^ As well as the related .50-100 and .50-105. Barnes, Frank C., ed. by John T. Amber, ".577/500 Magnum Nitro Express", in *Cartridges of the World*, p.116.
3. ^ Madis, p. 426
4. ^ Dave Anderson "Gone but not forgotten: Winchester's 9422 lever action". Guns Magazine. FindArticles.com. 21 Jan. 2009. http://findarticles.com/p/articles/mi_m0BQY/is_9_51/ai_n14816188
5. ^ Kelver, p. 47
6. ^ "Winchester Model 70 rifles (Win. Model 70)" (http://www.chuckhawks.com/win_70.htm). Chuckhawks.com. http://www.chuckhawks.com/win_70.htm. Retrieved on 2008-12-26.
7. ^ Houze, Herbert, *The Winchester Model 52: Perfection in Design*. Gun Digest Books 2004
8. ^ Stebbins, Henry, *Rifles: A Modern Encyclopedia*. Stackpole Co. 1958.
9. ^ Shooting writer Jack O'Connor, "...I saw the pilot model of New Model 70.' At the first glimpse I like to fell into a swoon. The action was simplified, the trigger guard and floor plate made of a flimsy looking one-piece stamping. The stock had stodgy lines and no checkering, and the barrel channel was routed out so much a herd of cockroaches could hold a ball below the barrel... I told them the creation would not sell, that it was one of the ugliest rifles I had ever seen."

http://en.wikipedia.org/wiki/Winchester_Rifle      5/4/2009

Fig. 4G
Example Entity Page from Wikipedia Knowledge Sharing Repository
For Winchester Rifle (Capture of Page 7 of 8)

Winchester rifle - Wikipedia, the free encyclopedia

10. ^ "1964 was a big year for Olin/Winchester. That was the year that their revised (for cheaper manufacture) line of firearms was introduced. The reaction from gun writers and the shooting public to the changes was swift and terrible, and Winchester has never regained their former position of dominance." Hawks, Chuck. "The Winchester Model 94".

Sources

1. ^ Out With A Bang: The Loss of the Classic Winchester Is Loaded With Symbolism (http://www.washingtonpost.com/wp-dyn/content/article/2006/01/19/AR2006011903278.html), *Washington Post*, January 21, 2006
2. ^ Winchester Rifles to Be Discontinued (http://www.washingtonpost.com/wp-dyn/content/article/2006/01/18/AR2006011801008.html?sub=AR), *Washington Post*, January 18, 2006
3. (http://www.havegunwilltote.com/index.php?sec=news&id=130&vo=3 Know the enemy: *Have gun will tote.com*, May 19, 2003
4. Labor history (http://www.iam837.org/Labor%20History.htm), *November 17, 2006*
5. End of an era as Winchester rifle plant prepares to close (http://www.pittsburghlive.com/x/pittsburghtrib/s_414568.html), *Pittsburgh Tribune-Review*, January 18, 2006
6. End of an era as Winchester rifle plant prepares to close (http://www.nctimes.com/articles/2006/01/18/business/news/19_21_441_17_06.txt), *NC Times.com* January 17, 2006
7. Kelver, Gerald O. Major Ned H. Roberts and the Schuetzen Rifle. 1998. Pioneer Press
8. Campbell, John. The Winchester Single Shot. 1998. ISBN 0-91721-868X
9. Madis, George, *The Winchester Book*, Houston: Art and Reference House 1971

External links

- Official website (http://www.winchesterguns.com/)
- Winchester Firearms question and answer forum (http://www.fsqfarm.com/Q/FAQ/410)
- The Winchester Arms Collectors Association, Inc. (WACA) is a non-profit corporation dedicated to the preservation of all Winchester produced and related items (http://www.winchestercollector.org/)
- Winchester 1860 Henry Rifle (http://www.antiquestopic.com/winchester-1860-henry-rifle/)
- Winchester 1873 Sporting rifle (http://www.antiquestopic.com/winchester-1873-sporting-rifle/)

Retrieved from "http://en.wikipedia.org/wiki/Winchester_rifle"
Categories: Rifles | Winchester Repeating Arms Company | Police weapons | Police weapons of Canada
Hidden categories: All articles with dead external links | Articles with dead external links since December 2008

- This page was last modified on 27 April 2009, at 06:05 (UTC).
- All text is available under the terms of the GNU Free Documentation License. (See Copyrights for details.)
Wikipedia® is a registered trademark of the Wikimedia Foundation, Inc., a U.S. registered 501(c)(3) tax-deductible nonprofit charity.

Fig. 4H
Example Entity Page from Wikipedia Knowledge Sharing Repository
For Winchester Rifle (Capture of Page 8 of 8)

Fig. 4I

Screen Capture of Graphic Interface Options for Wikipedia

Screen Capture of Knowledge Sharing Repository Editing Feature for Wikipedia

Screen Capture of Knowledge Sharing Repository History Feature for Wikipedia

An Embodiment of a System in Accordance with the Present Invention

Functional Modules

Example Translation of Template Infobox to Semantica content

An Embodiment of Infobox to Triplets Translation

An Embodiment of Semantica Triplets to Template Infobox Conversion

An Embodiment of Filled Triplets to Infobox Conversion

An Embodiment of Filled Infobox Conversion

Example Search Result

SYSTEMS AND METHODS FOR PAIRING OF A SEMANTIC NETWORK AND A KNOWLEDGE SHARING REPOSITORY

CROSS-REFERENCE TO RELATED APPLICATIONS

This application is a continuation of U.S. application. Ser. No. 12/436,052 entitled, SYSTEMS & METHODS FOR PAIRING OF A SEMANTIC NETWORK AND A KNOWLEDGE SHARING REPOSITORY filed on May 5, 2009, which claims benefit of U.S. Provisional Patent Application Ser. No. 61/050,588, entitled THE PAIRING OF A SEMANTIC NETWORK AND A KNOWLEDGE SHARING REPOSITORY, filed on May 5, 2008, the contents of which are hereby incorporated by reference herein in their entirety for all purposes.

This application is also related to U.S. application Ser. No. 12/621,478 entitled, SYSTEMS & METHODS FOR PAIRING OF A SEMANTIC NETWORK AND A NATURAL LANGUAGE PROCESSING INFORMATION EXTRACTION SYSTEM filed on Nov. 18, 2009, which claims benefit of U.S. Provisional Patent Application Ser. No. 61/115,543, entitled THE PAIRING OF A SEMANTIC NETWORK AND A NATURAL LANGUAGE PROCESSING INFORMATION EXTRACTION SYSTEM, filed on Nov. 18, 2008, the contents of which are hereby incorporated by reference herein in their entirety for all purposes.

FIELD

The disclosure relates generally to semantic networks and generation, analysis and updating of such networks. More particularly but not exclusively, the disclosure relates to systems and methods for facilitating communication and transfer to and among a group of collaborating users of networks of knowledge, such as in a "wiki," in a semi-structured way through a knowledge sharing repository.

BACKGROUND

A traditional semantic network is a formal structure for embodying or representing knowledge. It is designed to impose a rigorous structure upon knowledge so that an artificial intelligence computer program or expert system can operate on and reason from and with the knowledge. It is also used to embody the new knowledge resulting from the reasoning of such systems.

A traditional semantic network constrains how knowledge can be captured and organized so that it fits with the reasoning system's needs for reasoning, while still maintaining enough flexibility to handle variations in kinds of expert knowledge that needs to be reasoned with and about.

Most prior uses of semantic networks in computer software applications have been focused on managing information for the use of expert systems or other artificially intelligent programs. Experts setting about the task of entering their knowledge into such a traditional system are required to learn constrained methods for expressing what they know in a form that the expert system can use and reason with. Consequently, the methods used to operate on these traditional semantic networks have been tailored for the needs of the systems using the knowledge, and lack flexibility.

SUMMARY

The disclosure relates generally to systems and methods for pairing a semantic network with a knowledge sharing repository so as to update information in the semantic network based on information in the knowledge sharing repository, or vice-versa.

In one aspect, the disclosure relates to a computer implemented method of sharing information between a semantic network stored in a memory on a first computer system and a knowledge sharing repository comprising generating, on the first computer system, a set of data based on information included in the semantic network, accessing, from the first computer system, the knowledge sharing repository and updating the knowledge sharing repository based at least in part on the set of data.

In another aspect, the disclosure relates additionally to generating, on the first computer system, an additional set of data based on information included in the knowledge sharing repository and updating the semantic network based at least in part on the additional set of data.

In another aspect, the disclosure relates to a computer implemented method of sharing information between a semantic network stored in a memory of a first computer system and a knowledge sharing repository comprising accessing the knowledge sharing repository from the first computer system, retrieving, from the knowledge sharing repository, a set of data based on information included in the knowledge sharing repository and updating the semantic network based at least in part on the set of data.

In another aspect, the disclosure additionally relates accessing the semantic network, retrieving, from the semantic network, an additional set of data based on information included in the semantic network and updating the knowledge sharing repository based at least in part on the additional set of data.

In another aspect, the disclosure relates to a computer implemented method of sharing information between a semantic network stored in a memory of a first computer system and a knowledge sharing repository comprising retrieving, from the semantic network, a set of data based on information included in the semantic network, accessing the knowledge sharing repository from the first computer system and transferring, from the first computer system, the set of data to a computer system hosting the knowledge sharing repository for incorporation into the knowledge sharing repository.

In another aspect, the disclosure relates to a computer readable medium including processor executable instructions for sharing information between a semantic network and a knowledge sharing repository, including instructions to generate, on a first computer system, a set of data based on information included in the semantic network, access, from the first computer system, the knowledge sharing repository and update the knowledge sharing repository based at least in part on the set of data.

In another aspect, the disclosure relates to a computer readable medium including processor executable instructions for sharing information between a semantic network and a knowledge sharing repository including instructions to access the knowledge sharing repository from the first computer system, retrieve, from the knowledge sharing repository, a set of data based on information included in the knowledge sharing repository and update the semantic network based at least in part on the set of data.

In another aspect, the disclosure relates to a computer readable medium including processor executable instructions for sharing information between a semantic network and a knowledge sharing repository including instructions to retrieve from the semantic network, a set of data based on information included in the semantic network, access the knowledge sharing repository from a first computer system and transfer, from the first computer system, the set of data to a computer system hosting the knowledge sharing repository for incorporation into the knowledge sharing repository.

In another aspect, the disclosure relates to a system for sharing information between a semantic network and a knowledge sharing repository comprising a processor, a memory coupled to the processor, wherein a semantic network is stored in the memory and a computer readable medium including processor executable instructions to access the semantic network, generate a set of data based on information included in the semantic network and update the knowledge sharing repository based at least in part on the set of data.

Various additional aspects of the disclosure are further described below in conjunction with the appended drawings.

BRIEF DESCRIPTION OF THE DRAWINGS

The disclosure is more fully appreciated in connection with the following detailed description taken in conjunction with the accompanying drawings, wherein:

FIG. 4b-4h show additional details of the entity page from FIG. 4a;

FIG. 4i shows an example screen capture of the Wikipedia Winchester Rifle web page;

DETAILED DESCRIPTION

Figure 1:
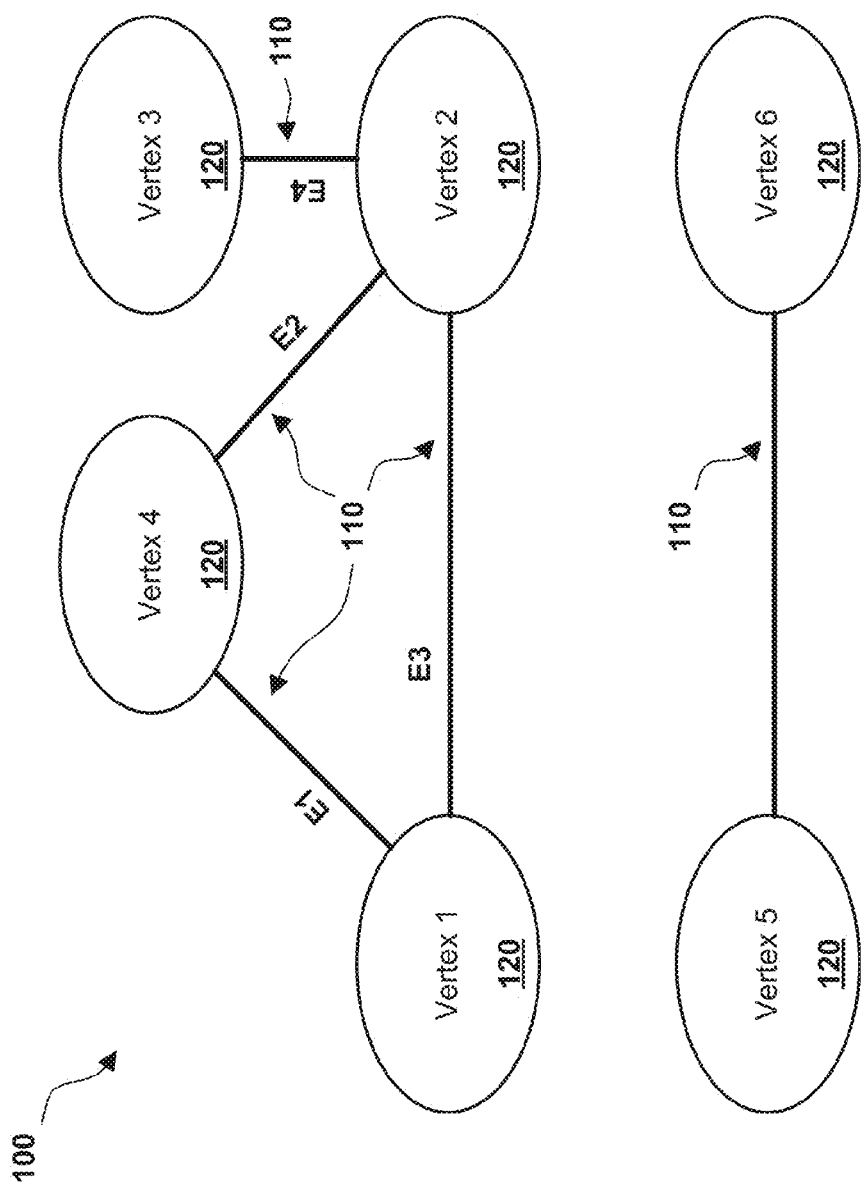
FIG. 1 is a high level illustration of a traditional semantic network.

Summary of Terminology and Definitions Used Herein

Various terminology is used herein to describe details of particular embodiments of the disclosure. This terminology and associated definitions are used for purposes of explanation, not limitation. Accordingly, other terminology and definitions may also be used to represent the same or equivalent functionality as is described herein. In order to facilitate understanding of the terminology used herein, a summary of terms used herein and their associated definition is provided below:

Concepts—Describes each individual labeled Vertex in a Knowledge Structure.

Edges—Edges are links that are used to tie together Vertices.

Element Types—As applied to Entities (Concepts, Triplets, Relation Types and other kinds of Elements), the term describes labels applied to Entities to categorizing them and embody meaning about the kind of entity they represent. Associated with each Element Type may be a separate network of linked, typed entities called a Semantica®-style Knowledge Structure Template that includes links that are typically expected to be present in describing the details of entities of that type, although Triplets connected to an entity of this element type are neither required to include these Semantica® template links, nor limited to only these links.

Gap—A Gap is a concept that has been marked to indicate that it is an unknown or unfilled-in value that is needed to specify this attribute's value.

Knowledge Sharing Repository—A Knowledge Sharing Repository is any collection of user- or community-generated aggregations of information as a collection of web pages or as an otherwise collected knowledge base of entity-focused documents, pages or other information content. Knowledge Sharing Repositories are frequently referred to as, but are not limited to, so called "wikis," such as may be found at online sites such as Wikipedia (www.wikipedia.org). However, other types of Knowledge Sharing Repositories that are not in the form of web pages also exist, and the functionality provided by the disclosure may also be applied to them unless noted otherwise.

Knowledge Structure—As used herein, this refers to a Semantica®-Style Knowledge Structure embodying a Semantic Network and based on Semantica® software applications. Unless noted otherwise, implementations of the disclosure may be equally applied to other types of Semantic Networks that include the characteristic features described herein and/or known in the art, and not just specifically to Knowledge Structures as defined above. For purposes of providing details of specific implementations, the term Knowledge Structure may be used interchangeably herein to refer to a Semantic Network; however, the functionality of the disclosure may be equally applied to other similar or equivalent structures for organizing data that lacks explicit structure.

Knowledge Object (Attachments)—A special case of an Entity that encapsulates or points to a document such as a picture, a text note, the URL of a web page, or any other electronic document, allowing it to be linked to other entities.

Labels—Labels on Edges are used to characterize the nature of the link between two Vertices.

Relation Type—These define how two Concepts are tied together, such as in a Triplet.

Semantic Network—A Semantic network is a multi-dimensional web of ideas or things that are linked together in specific ways. As used herein, the terms "semantic network" and "knowledge structure" may be used interchangeably, with a knowledge structure referring, for purposes of example, to a specific type of Semantic Network used in Semantica® software applications.

Triplet (individual Edges or Links), tying two Concepts together labeled with a particular Relation Type.

Vertex, Vertices—Vertices (sometimes also known as Nodes) are the fundamental unit from which graphs are formed. Vertices may have additional structure, such as representing Concepts or Knowledge Objects in Semantic Networks.

Semantic Networks Overview

A semantic network is a multi-dimensional web of ideas or things that are linked together in specific ways. Semantic networks have been historically used in fields such as artificial intelligence to aid in the organization and embodiment of expert knowledge to feed computer-automated deductive, problem solving or training applications.

A network editing and analysis tool is a computer software application for creating, modifying and exploring any network-like collection of links.

A knowledge sharing repository is any collection of user- or community-generated aggregations of information as web pages or in the form of a collection of entity-focused documents, pages or other electronic information. Knowledge sharing repositories are frequently referred to as, but are not limited to, so called "wikis," such as may be found at the online site Wikipedia (www.wikipedia.org). Other types of knowledge sharing repositories that have the same or similar key features that may be used by embodiments of the disclosure may include blogs, social networking web sites or other similar or structurally equivalent sites or databases.

One primary aspect of the disclosed approach to the creation, management and sharing of knowledge about a set of topics or entries by representing and manipulating them as both editable semantic network information and as editable pages or other data formats in a knowledge sharing repository. This aspect, which focuses on human experts, learners or peers capturing, managing and transferring network representations of knowledge in and among themselves through the pairing of a semantic network editing environment and a knowledge sharing repository, forms one basis of uniqueness and differentiation of the present approach from general wiki-editing or other knowledge repository management tools known in the art that are based on contributors manually editing individual pages as text, or through structured tools such as forms, spreadsheets and databases.

Attention is now directed to FIG. 1, which illustrates an example of a traditional semantic network 100. Semantic network 100 is an undirected, non-simple graph with labeled edges 110 and (possibly labeled) vertices 120. The vertices and edges may be interpreted individually or in combination to form one or more of the four fundamental semantic network constructs:

1) Vertices, possibly with labels (as shown in FIG. 1, vertices 120 are labeled Vertex 1 through Vertex 6 for purposes of illustration);
2) Edges tying two vertices together;
3) Labels on Edges (as shown in FIG. 1, edges 110 are labeled E1 through E4, with the lowest edge having no label) characterizing the nature of the link between the two vertices; and
4) Entity Types associated with the vertices (not shown in FIG. 1).

Every traditional semantic network is an assembly of these elements (vertices, edges, edge labels and entity types). Each one imposes rules about the ways in which vertices and edges are labeled or typed and about the ways in which reasoning is performed based on those labels or types.

The assignee of the present application, Semantic Research, Inc., designs and develops tools for creating, editing and interacting with semantic networks. One provided product is Semantica® software, which supports a form of semantic network known as a Semantica®-style knowledge structure (also denoted herein as a "knowledge structure" for brevity).

A knowledge structure is an idealized and generalized structure for capturing knowledge. It is related in its most abstract form to the general description above of a traditional semantic network. However, in application, it is particularly appropriate for capturing data and information for human use that lacks explicit structure, that is difficult to impose a rigorous structure upon or that is tacit in nature (and hence not commonly or easily expressed in computer documents intended for direct comprehension by humans).

A knowledge structure provides extensive flexibility in how knowledge is captured and organized, while still maintaining an effective and unambiguous framework for qualitative, cognitive (human) interaction and quantitative, automated machine interaction, storage and retrieval. In this sense, a knowledge structure sits at an ideal midpoint between the abstract notion of how knowledge is composed and the forms in which knowledge is conventionally concretely organized in computer-based representations such as diagrams, word processing documents, spreadsheets, databases, and formal networks.

A knowledge structure may further extend the structure of a traditional semantic network by: a) promoting edges to the status of vertices or entities, often referred to as reifying the edges; b) promoting edge labels to the status of entity types, called relation types to distinguish them from other kinds of entity types; and/or c) by promoting entity types to the status of vertices or entities, that is, by also reifying element types.

A knowledge structure may also be uniquely easy for humans to enter and organize compared with other more conventional representations. This ease of creation is particularly facilitated by allowing creation of individual edges without need for a context, and by providing great flexibility in the definition of edge labels and other entity types. This flexible editing may be instantly saved in a network database for shared access.

In various aspects, the disclosed approach is focused on applying these constructs and techniques to two very different but related tasks:

1) the one-to-many transfer or communication of knowledge from a human knowledge source (possibly, but not necessarily, an "expert") to users of that knowledge, and;
2) the sharing and collaborative massaging of knowledge by a group of knowledge workers.

As such, various embodiments of the present system and method may be provided as a generalized tool for use on computer based systems to provide a variety of applications. This generalized tool may be incorporated directly into a network editing and analysis tool such as the Semantica®, software applications or other network editing and analysis tool. Alternately, embodiments may comprise an "add on" or "plug-in" application for incorporation into or operation in conjunction with a network editing and analysis tool. In yet other implementations, the disclosed embodiments may be in the form of a standalone application disposed the implement the functionality herein.

The teachings of the present disclosure may be applied to a wide range of applications in different fields. These may include applications in a range of business processes, intelligence capture and analysis, as well as a wide variety of other applications. Specific applications to which such teaching may be applicable include, but are not limited to: education and training; knowledge construction, management and transfer; bio-informatics; genealogy; law enforcement; insurance; intelligence; law; medicine; entertainment; other case-management fields; other fields involving sharing of knowledge; as well as other applications.

Semantica®-Style Semantic Network/Knowledge Structure Overview

Figure 2:
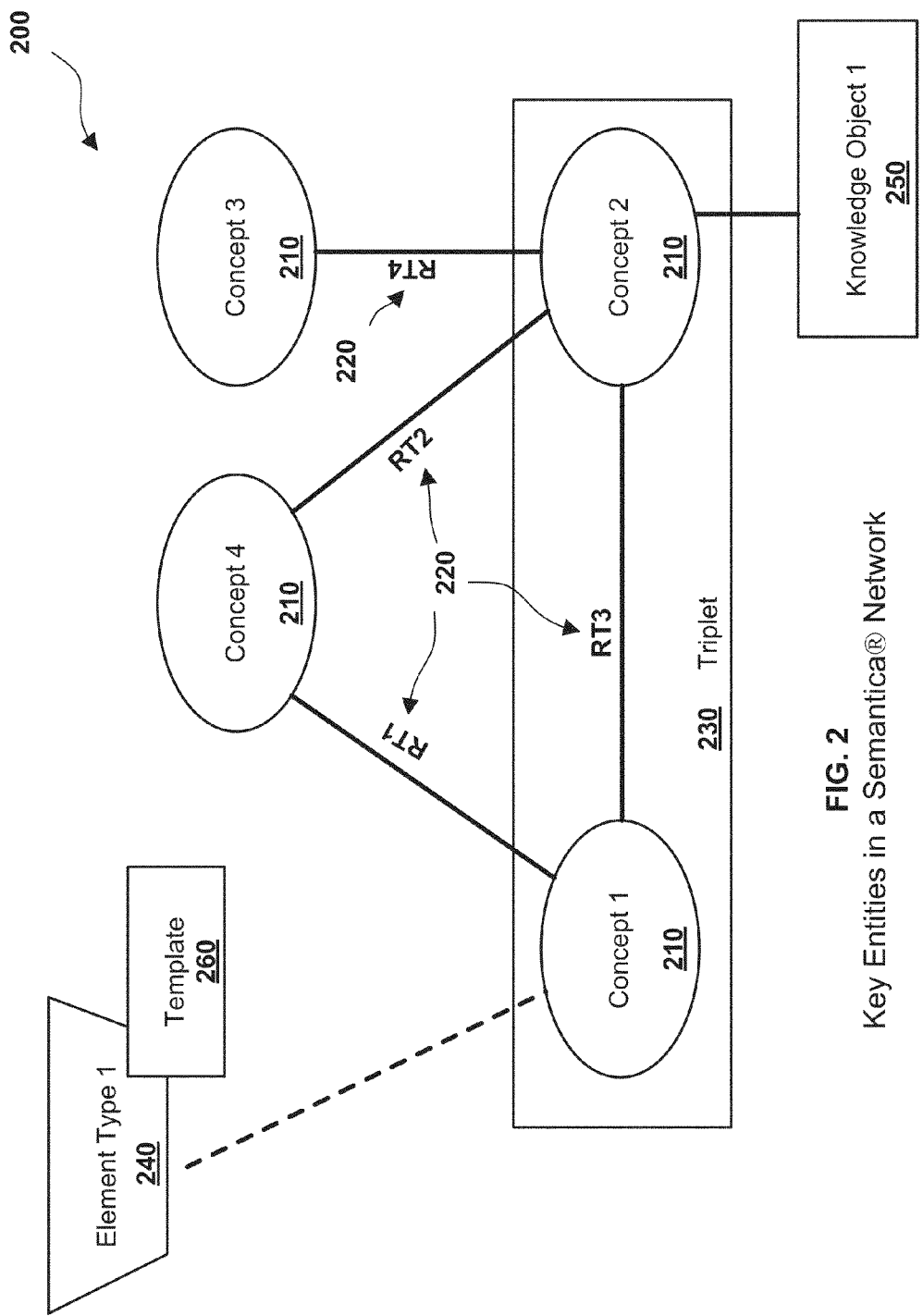
FIG. 2 is high level illustration of entities in an Semantica® semantic network.

In an exemplary embodiment, the present system and method may operate in conjunction with a specific form of semantic network denoted as a Semantica®-style knowledge structure (also denoted herein as a "knowledge structure" for brevity). Referring to FIG. 2, an example knowledge structure 200 is illustrated. knowledge structure 200 is, at base, a form of the structure shown in FIG. 1, i.e., an undirected, non-simple graph with labeled edges or links and vertices. However, knowledge structure 200 is made up of vertices and edges with additional structure imposed on them, as shown in FIG. 2.

These vertices and edges may be interpreted individually or in combination to form one or more of the fundamental knowledge structure constructs:

A) Concepts 210 (entities or vertices);
B) Relation Types 220 (types or labels for edges or links);
C) Triplets 230 (individual edges or links), tying two concepts together labeled with a particular relation type; and
D) Element Types 240 applied to entities (concepts, triplets, relation types and other element types).

Knowledge Object 250, sometimes interpreted as a fifth fundamental construct depending on context, is a special case of an entity that encapsulates or points to a document such as a picture, a text note, the URL of a web page, or any other electronic document, allowing it to be linked to other entities. Examples of knowledge objects include the picture/image 416 as shown in FIG. 4b, and the various URLs to external web sites, and the various internal wiki-page links in the See Also section 418 and References sections 420 as shown in FIG. 4b, and in the Sources 422 and External Links 424 sections as shown in FIG. 4h. Every knowledge structure is an assembly of entities, relation types, triplets, element types and knowledge objects.

The methods and apparatus described herein depend upon the adaptation and generalization of the broadest features of a traditional semantic network described above to shift the focus of their application to support human reasoning and application in semi-structured and easily modifiable forms. These methods are generally applicable to a wide variety of business processes and other knowledge-related processes.

Similar tools as are known in the art are typically more limited because they enforce limited and pre-defined collections of elements on the underlying data. Most frequently, the set of possible relation types is very limited and frequently restricted to pre-defined fields in predefined data-entry forms, database tables or other highly-structured data formats.

As used herein, the term Concept (such as, for example, Concepts 210 as shown in FIG. 2) describes each individual labeled vertex within a knowledge structure. In the most basic cases, the label is a locally unique identifier that each concept also has associated with it. These concepts represent individual objects, ideas or thoughts that have meaning Since a knowledge structure is a non-simple graph, any two concepts within a knowledge structure may be connected by a common edge. In general these edges (known as triplets or instances of relation types as further described below) are graphically represented by lines on a two-dimensional plane or in a simulated three-dimensional space. However, the knowledge being represented has no physical dimensions per se and such dimensional representations are used purely as a medium for human visual perception and manipulation, and for publication on paper, computer screens, and web pages.

A Gap is a concept that has been marked to indicate that it is an unknown or unfilled-in value that is needed to specify this attribute's value.

The term Triplet (such as, for example, Triplet 230 as shown in FIG. 2) is used to describe a link between two entities which has been labeled with a relation type. The two entities and the relation type are the three components that results in the terminology triplet. For example, Triplet 230 consists of a link connected between Concept 1 and Concept 2 and labeled RT3. In a Semantica®-style knowledge structure, triplets contain two additional components; the element types of the two entities being linked.

The term Relation Type (such as, for example, relation types 220 as shown in FIG. 2) is used to describe labels that are applied to triplets or links to categorize them and embody meaning represented by the link. An Anonymous Relation Type is a relation type that has been marked to indicate that the actual type of relationship is still unknown or unspecified and needs to be filled in at a later time when possible. In more sophisticated semantic networks, relation types form a type hierarchy, with each relation type having a super-type, and a predefined root for the most abstract of relation types. These are called "related" in Semantica® software implementations.

The term Element Type (such as, for example, element type 240 as shown in FIG. 2) is used to describe labels applied to entities to categorizing them and embody meaning about the kind of entity they represent. Associated with each element type is a separate network of linked, typed entities called a Semantica®-style knowledge structure Template (such as, for example, template 260 as shown in FIG. 2) that includes links that are typically expected to be present in describing the details of entities of that type, although triplets connected to an entity of this element type are neither required to be among these Semantica® template links, nor limited to only these links.

In more sophisticated semantic networks, element types form a type hierarchy, with each element type having a super-type, and a predefined root for the most abstract of element types, called "Element" in Semantica® software implementations. Relation types are also element types, although this is not essential.

In a preferred embodiment, element types form a strict hierarchy, that is, only one parent element type for each element type; but elements are allowed to have any number of element types. Alternative embodiments that have been implemented include loosening to multiple parents for element types and limitation to single element types on elements. When the network editing tool supports only a strict hierarchy in its built-in element type structure but allows triplets that tie two element types together, as in the current preferred embodiment, a custom relation type such as "has supertype/has subtype" may be used to store a non-hierarchical category structure to match a non-hierarchical ontology in the targeted knowledge sharing repository.

Together, the set of all element types and relation types, along with their possibly-re-entrant hierarchical structure and their templates and other appended information, constitute what is referred to as an Ontology for the semantic network. The ontology can be embodied entirely as a special case of a knowledge structure, but in a preferred embodiment it is implemented with more efficient specialized representations which can still be viewed as a network or knowledge structure.

Description of Components of a Knowledge Sharing Repository

Figure 3:
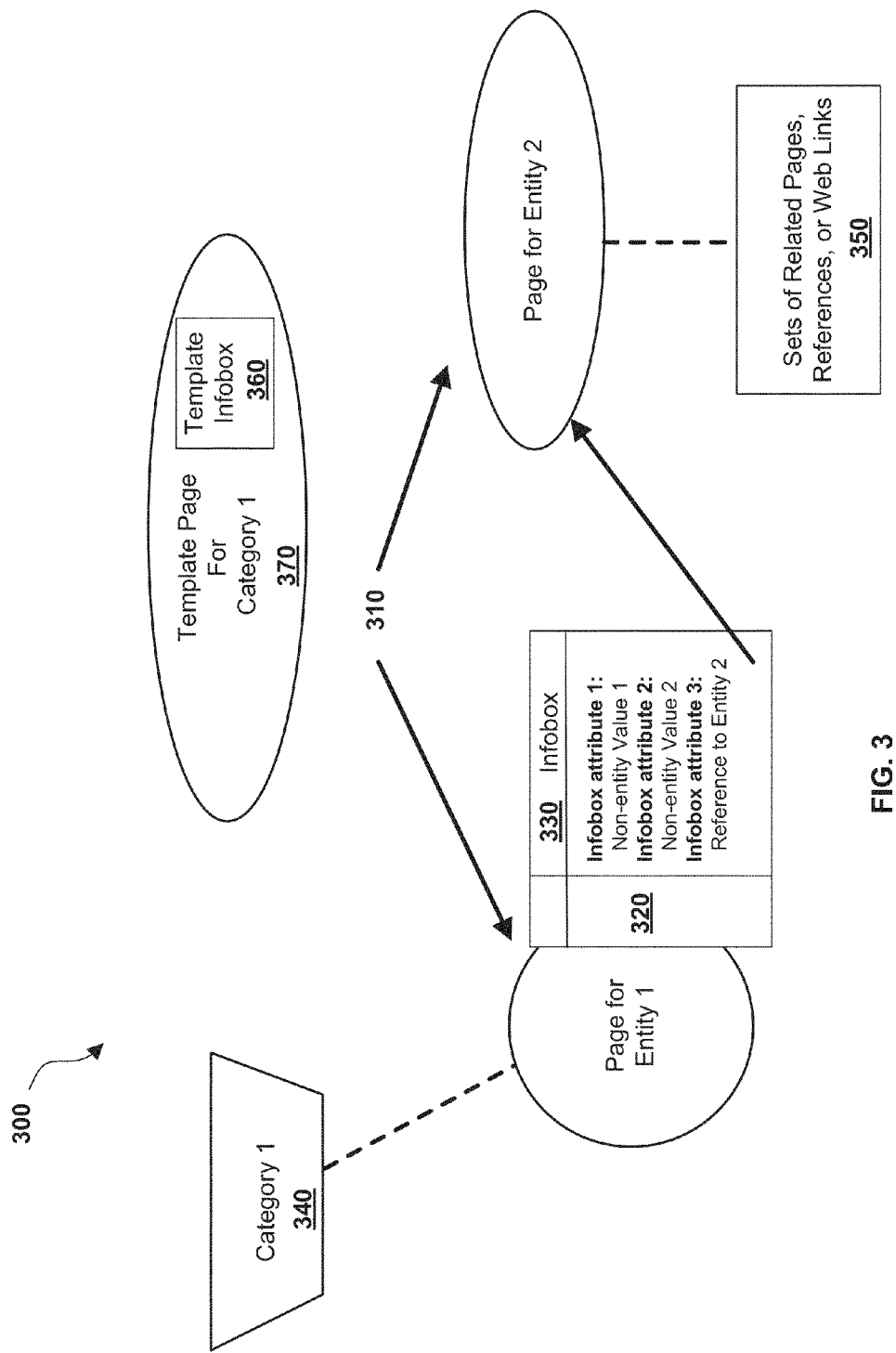
FIG. 3 is an illustration of an example knowledge sharing repository and corresponding features.

Attention is now directed to FIG. 3, which illustrates an embodiment of a knowledge sharing repository 300 (also denoted herein as "repository" for brevity). As noted previously, knowledge sharing repository 300 may be any collection of user or community-generated aggregations of information stored on a computer system such as a server, Internet host computer system, proprietary system, or other computer system.

These aggregations are frequently presented in HTML form as web pages, but for the purposes of this disclosure may easily be presented via any of a variety of other methods that aggregate information about an entity together. The most well-known current form of knowledge sharing repository having the key features that may be used by the disclosed system is frequently referred to as, but in no way limited to, a "wiki," which can be thought of as a user-editable online encyclopedia or information reference. Perhaps the most well known current wiki is Wikipedia, an online encyclopedia located at www.wikipedia.org.

Other kinds of knowledge sharing repositories that have the same or similar features include many types of blogs and social networking web sites which are commonly organized along the same concept, being collections of user-editable pages, each about an entity or topic, with enough structure to allow programmatic manipulation by the disclosed embodiments. Any of these alternate forms of knowledge sharing repositories may also be compatible with the disclosed embodiments if they support the functionality and structure described herein.

Key features of a knowledge sharing repository upon which the disclosed embodiments may operate on and interact with include:

1. A Collection of Pages or Other Similar or Equivalent Data Structures—This feature is a collection of pages, abstractly represented as 310 in FIG. 3, wherein each page is focused on a particular topic or entity. One specific example of such an entity-focused page is page 400 as shown in FIGS. 4a-4h. Page 400 is taken from Wikipedia, and focuses on the topic of "Winchester Rifle." It is noted that page 400 is shown merely for purposes of explanation and example, and is not intended to be in any way limiting. It is also noted that the illustration of page 400 in FIGS. 4a-4h is shown over 8 pages in the drawings for clarity due to the size of this web page and quantity of associated content.

The following characteristics are typically stored for each entity page (or other data/information structure in the knowledge sharing repository):

A Unique Label, Name or Other Designator—A unique label and/or name which can be used as unique identifiers, through a standard reference mechanism, to locate the page. In a preferred embodiment, the label and name for a particular entity are identical or can be easily derived from each other; however, other embodiments may allow duplicate names that are not derivable from the label or vice-versa. This concept is illustrated as label 410 in FIG. 4a, which describes that the page and associated information is about the topic of Winchester Rifles.

a. An optional format specification that is contributory and possibly limiting in purpose.

b. An optional set of categories 340 assigned to each page, possibly providing inherited information and formats. Each category may also be a similar entity with a corresponding entity page with this set of page characteristics. For example, a list of categories 426 are shown in FIG. 4h, which can be accessed via hyperlink from the Winchester Rifle page.

c. A generally unstructured text section (although possibly formatted in ways that don't restrict content, but only appearances of layout or text style) within which text is stored, that contains knowledge to be shared and edited about or related to the entity. This is illustrated as text section 412 in FIGS. 4a-4g.

d. A semi-structured attribute section 330 within which knowledge is stored that can be reduced to entities that have attributes and values (also known as properties, fields, data members, etc. in various terminologies commonly in use in the field). This section is sometimes called the Infobox in a wiki form of repository and, for simplicity of description, we use this term in this document to refer to any similar semi-structured attribute section associated with each entity in the repository. The Infobox usually contains only one level of attributes 320 and values applying to the entity described by this page, but nested levels of attributes within values or network structures are sometimes used. An important capability needed here is a structure that allows representations of the form:

Entity→attribute name→Entity or simpler value

Values are in simplest form strings, but are more usefully allowed to be references to other entities which can be used to link to the corresponding entity pages. For example, Infobox 414 as shown in FIG. 4b includes attributes 414a in the left column and associated values 414b in the right column, with links on some of the attributes and values to other entities/web pages.

e. A set of sections 350, frequently located at the bottom of the page (but not required to be), which provide a way to associate links to related pages that use the reference method described next to connect to pages in the repository using the label, reference publications, or other documents supporting the content or from which the content was acquired ("References"), and external links using URLs or other forms of URIs to web pages or other externally addressable repositories that are associated with the entity ("External Links") For example, See Also section 418 and References section 420 are shown in FIG. 4g, and a Sources section 422 and External Links section 424 are shown in FIG. 4h.

Each category entity may have an optional Template page 370, which has a Template Infobox 360 containing the inherited attributes that the Infobox of entities labeled with that category can or should contain, for maximum benefit from use with the disclosed embodiments.

2. A Reference Mechanism—This feature relates to one or more reference mechanisms, usable either manually or automatically by application programs, to access individual pages. Possible reference mechanisms for use with the disclosed embodiments include, but are not limited to, 1) a Uniform Resource Indicator (URI) or Uniform Resource Locator (URL), 2) a communication method through a software and/or hardware connection such as a named pipe or standard port or standard file location, and/or other reference mechanisms as are known or developed in the art. Other proprietary or specialized methods are also possible, typically to the extent that as there is a unique label, name or other designator for each page that can be used to access it in some programmatic fashion.

3. Marking Methods—This feature relates to marking methods that can be included in the body of unstructured or semi-structured text indicating that the text so marked should be considered an entity, and if a page for that entity exists should be used to link to that entity's page. These marking methods should generally include one which indicates a link to a known page and also one for indicating a "gap" that indicates that the actual entity to be linked to is currently unknown or not provided but needs to be provided at a later date.

4. User Editable Pages—This feature relates to pages that are allowed to be edited by users, either manually by individuals or automatically by a program, or ideally by both. Where the page cannot be edited automatically by a program, embodiments typically provide users with strings in their clipboard to help with manual editing. Where manual editing is not allowed, the transformations are done entirely automatically through a program and some, but not all, of the benefits of the system and method disclosed herein may be unavailable. An example of this is shown in FIG. 4i, which is a screen capture of the beginning of the Winchester Rifle Wikipedia page, including full graphics. As shown in FIG. 4i, Wikipedia provides a tab 430 to allow users to edit the contents of the page. A screen capture of the editor and associated functionality initiated from tab 430 is shown in FIG. 4j.

5. Page Sharing Among Users—This feature relates to page sharing among multiple users who may be allowed a variety of access methods, including but not limited to:
   a. Reading the content of an individual page, or portions thereof, as specified by a per-user or per-group fashion on various portions.
   b. Editing the specific contents of individual pages, or portions thereof.
   c. Editing the underlying format for individual pages, or portions thereof
   d. Editing a possibly hierarchical collection of categories for labeling each page and thereby providing an inherited but modifiable standard format.
   e. Specifying and/or editing the categories for each individual page.
   f. Other page viewing and/or editing mechanisms.

6. Journal of Changes—In their most capable form, the knowledge sharing repository maintains a complete journal of all changes/edits, storing each change made along with the author, date, time, and/or other relevant data or information. For example, tab 432 as shown in FIG. 4i allows a Wikipedia user to review the history of edits to the associated web page. A screen capture of this journal/history feature for the Winchester Rifle page is shown in FIG. 4k.

7. Full Hierarchy of Categories—In a preferred embodiment, the repository supports a full hierarchy of categories, each with associated Template Infoboxes, forming an analog of the semantic network ontology that can be mapped to and from it. For example, as shown in FIG. 4h, the categories section 426 illustrates a hierarchy of categories associated with Winchester Rifle.

Overview of Functionality of Disclosed Embodiments

In various embodiments, the disclosed system and method address the need to update semantic networks (such as semantic networks in the form of a knowledge structure as described herein, as well as others) based on information in a knowledge sharing repository, such as a wiki. Conversely the present approach may also be used to update a knowledge sharing repository based on information stored in a semantic network. The information in the knowledge structure and knowledge sharing repository are stored on a computer readable medium, in the form of data, typically in a database or other storage format, on or in connection with a computer system configured to host the knowledge structure or knowledge sharing repository.

In one aspect, disclosed is a system and associated method for pairing a semantic network and a knowledge sharing repository, such as a wiki. The method may include stages of generating, on a first computer system, a set of data based on information included in the semantic network, and updating the knowledge sharing repository based at least in part on the set of data. The method may further include stages of generating a set of data based on information included in the knowledge sharing repository and updating the semantic network based at least in part on this set of data. In addition, in some embodiments the present approach may be used to generate a new semantic network from information contained in a knowledge sharing repository, or generate a new knowledge sharing repository from information contained in a semantic network.

In an exemplary embodiment, the disclosed approach is directed to pairing a knowledge structure with a wiki to update the knowledge structure based on the wiki, or update the wiki based on the knowledge structure.

In some implementations, the semantic network and knowledge sharing repository may be stored on a common computer system, whereas, in other embodiments the semantic network may be stored on a different computer system than the knowledge sharing repository. In the latter case, the method may include the stages of communicatively coupling the first computer system, on which the semantic network is stored, to a second computer system on which the knowledge sharing repository is stored, and transferring the set of data based on information included in the semantic network, to the second computer system. In addition, this method may also include transferring the set of data based on information included in the knowledge sharing repository to the first computer system.

Updating and/or transfer of information between the semantic network and the knowledge sharing repository may, in some implementations, be done automatically, whereas, in other implementations it may be done manually based on a user provided input requesting the update. In addition, the updating of the semantic network or the knowledge sharing repository may be done in conjunction with a semantic network editing program or a knowledge storage repository editing program, either through integration of a user interface into such a program or through an external user interface and/or one or more APIs.

Description of Components for Implementing Disclosed Embodiments

Figure 5A:
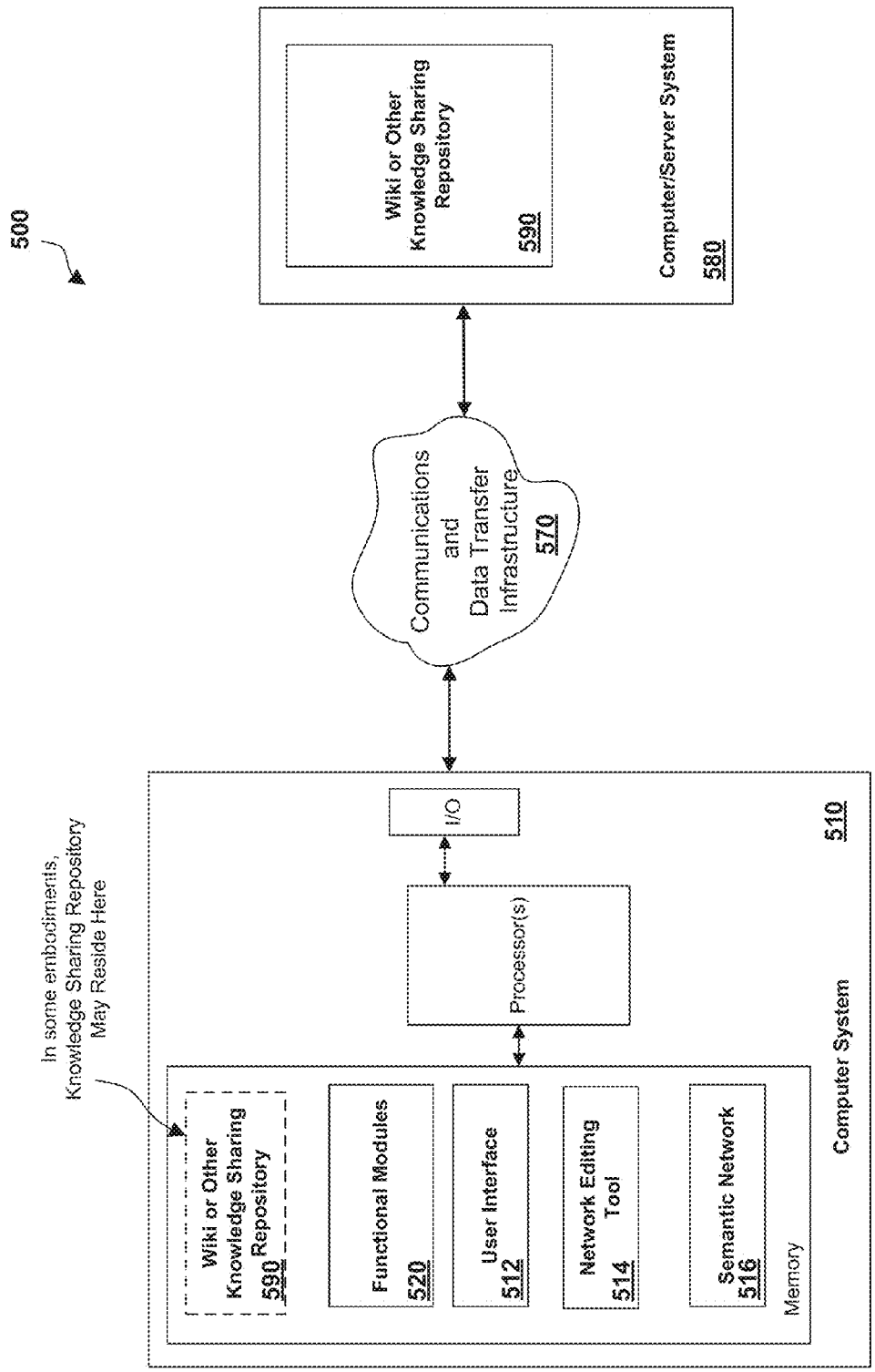
FIG. 5a is an illustration of a system in accordance with the disclosure on which embodiments may be implemented.

In order to implement the above described functionality, as well as other functionality as described herein, a system including a set of primary components may be used. For example, primary components and an environment upon which embodiments disclosed herein may be implemented are shown in FIG. 5a. These components include a computer system 510 (also denoted as Component 1) configured to store or access data defining a semantic network 516, a computer system 580 configured to store or otherwise provide access to contents of a knowledge storage repository 590, a communications and data transfer infrastructure 570 (also denoted as Component 3) to facilitate communications between computer system 510 and 580, as well as one or more user interfaces 512. Additional details of embodiments of these components are further described below.

Component 1—This is typically a computer system, such as computer system 510, configured for running a network/link editing and analysis environment. This will typically include a program for semantic network/knowledge structure editing, such as the Semantica® applications provided by the assignee of this application. Various embodiments disclosed herein may be implemented on top of a network/link editing and analysis environment providing the key capabilities described above; however, they do not typically depend on a particular implementation of such a tool. In addition, computer system 510 typically stores a semantic network 516 or is configured to access semantic network 516 if it is hosted on an external system (not shown).

A typical computer system 510 for implementing embodiments disclosed herein includes one or more microprocessors coupled to one or more memories or other data storage components, with the microprocessors configured to execute instructions that may be stored in the memories or on other machine readable media to implement the functionality described herein. Along with one or more memories configured for storing processor readable instructions and/or data, the computer system may include input/output (I/O) interfaces coupled to the processors and/or memory for communicating with external systems, one or more databases for storing and retrieving information and data, as well as other components and peripherals such as displays, monitors, keyboards, mice and the like. The system may include other components such as disk drives, network interfaces, drives for writing to CD, DVD, BD, or other readable or writable storage media, as well as other computer system components and peripherals as are known or developed in the art.

To the extent that some of the above-described capabilities are missing, some components may become harder to implement or require more manual work, primarily in the form of copying and pasting by the user, to make up for what cannot be automated. Such a lack of these capabilities may reduce some of the benefits provided by some embodiments disclosed herein, without entirely eliminating its usefulness.

Component 2—This may be a computer, server, or other computer based system, such as computer system 580 (in some implementations the same computer or a similar computer as described in Component 1 above), accessible through a communications network, such as network 570, that stores or provides access to a knowledge sharing repository, such as repository 590, having the wiki-like characteristics described previously. Although the knowledge storing repository is generally stored on computer system 580, in some embodiments it may be stored on computer system 510 or on an external computer system along with the semantic network. This computer generally includes the same type of components as described above with respect to component 1, but may include additional components to facilitate rapid multi-user access via the Internet or other networks, may comprise multiple servers, etc.

The disclosed embodiments may be implemented in conjunction with any knowledge sharing repository having the key capabilities described above (or, in some embodiments, a subset thereof), and do not generally depend on a particular implementation of a wiki, blog, social network, or other knowledge sharing repository. As noted previously, to the extent that some of the above-described capabilities are missing, some components may become harder to implement or require more manual work, primarily in the form of copying and pasting by the user to make up for what cannot be automated. Such a lack may reduce some of the benefits provided by the various embodiments without entirely eliminating its usefulness.

Component 3—A communications and data transport infrastructure, such as infrastructure 570, connecting the semantic network editing tool and the knowledge sharing repository, and supporting HTTP, HTTPS, PKI, or other communications protocols, either secure or open, that allow for the exchange of data between the two tools and for each tool to initiate actions within the other and to maintain secure connections and establish encrypted or network-based user identification to provide element-level access control and other security measures. This infrastructure may include wired or wireless networks, cellular networks, landlines, or other network infrastructure. In a typical embodiment, this network structure will be based on a standard TCP/IP protocol stack providing networked communications between computers as is typical in most computer environments. However, it could also use any mechanism that encodes packets of information from one computer, transmits them to another computer and translates them on that computer into invocation of the standard protocols such as HTTP, HTTPS, PKI, HTML, CSS, etc. on the remote, or possibly the same, computer.

Component 4—This may be any of a number of automated interfaces and/or a manually invoked user interfaces, such as interface 512, that supports connecting the components of the disclosed embodiments to the network editing tool, such as network editing tool 514, and the knowledge sharing repository, such as repository 590, to allow use of various aspects of the disclosed embodiments. These can be implemented inside either tool or externally as appropriate for a particular use.

A preferred embodiment of this component is in an environment in which the network editing tool is the primary workspace for the user, and the user interface is a collection of small plug-in UI tools or widgets embedded in the network editing tool's user interface at the places where a user can most conveniently invoke them when desired, sometimes from the main menu bar, and sometimes from a contextual menu. In an embodiment which more tightly couples an entire semantic network with a knowledge sharing repository so that all changes to either are immediately transferred to the other, most of this UI would not be needed.

In an embodiment where a network editing tool is still the user's primary environment but does not permit the addition of new UI elements, an external UI would typically be the best implementation. In an environment where the knowledge sharing repository is the primary workspace of the user, adding the UI to the repository's UI would be an alternative preferred embodiment. In each case, the desired actions provided by the components of the embodiments described below would be the same and all that would typically change would be the place and manner in which a user would invoke them.

In particular, a preferred embodiment of the teachings herein has been built as add-on (or plug-in) tools that can readily be added to the execution environment of the Semantica® family of software applications or to similar software applications. These can also easily be extended to any environment providing a semantic network/knowledge structure persistence mechanism supporting the key features described above, including, but not limited to: i2 Analyst Notebook, Palantir, Inxight, Protégé, and the like.

These implementations are easily modified to run against alternative persistence models such as A) the Semantica®

TripletSphere™ product which implements persistence for Semantica®-style knowledge structures in a stand-alone database with custom tools implementing the querying and editing of entities, triplets, and element types with their templates, B) the Semantica® Staging DB database which implements a simplified form of semantic network sufficient to support these same mechanisms, or C) any other storage mechanism for persisting entities and their connections through triplet-like links.

Targeted Data Components within the Network Editing Tool for a Typical Embodiment of Use 1. A Semantic Network—This will typically be one or more semantic networks being edited with a semantic network editing tool. The target semantic network is typically a Semantica®-style knowledge structure, but could be any semantic network that provides the key knowledge structure features of entity types, relation types on triplets, and templates associated with entity types.

In typical embodiments, the present system does not require that element types or relation types be allowed to be entities to provide the primary benefit. However, if they are, then the Infobox for a knowledge sharing repository template can also be modified.

2. Entity and Associated Components—A single targeted/selected/focused entity, the triplets the entity is part of, and additional associated entities on the other ends of the triplets, along with other connected pieces of knowledge associated with the targeted and additional entities. This is a combination of: (1) single entity that is the focus and corresponds to a target page in the knowledge sharing repository, (2) the collection of all the triplets that have the focus entity on either end of the triplet, and (3) other entities such as properties, annotations, attachments, knowledge objects and the like.

Any implementation of a semantic network would typically support a simple query into the semantic network persistence mechanism requesting this collection of triplets and other associated entities and pieces of knowledge.

3. Entity Type—An entity type for the targeted entity and triplets and associated entities in the template for said entity type. Any implementation of a semantic network that supports entity types will typically support a simple query into the semantic network persistence mechanism requesting the entity type associated with an entity. Accessing the triplets in the template for an entity type is also a simple query into the semantic network persistence mechanism.

Targeted Data Components within the Knowledge Sharing Repository for a Typical Use of a Disclosed Embodiment 1. One or more aggregates of entity centered knowledge sharing repository pages being edited or accessed via the repository pages being edited or accessed via the repository interfaces. A preferred embodiment of a non-secure implementation of this component is Wikipedia, or any other knowledge sharing repository implemented using its underlying MediaWiki software, which exposes a collection of web pages providing HTTP access through a standard URL structure. A preferred embodiment of a secure implementation of this component uses a custom adaptation of the open-source MediaWiki software that incorporates user-level access control and HTTPS and/or PKI to maintain secure connections and establish encrypted or network-based user identification and other security measures.

2. A single targeted/selected/focused entity's page containing various sub-components. A preferred embodiment through Wikipedia/MediaWiki provides a single CSS-based HTML page for each entity, known as a "Wiki word" in Wikipedia, whose unique ID (for insertion into the standard URL structure) is constructed by replacing the blanks in the Wiki word with underscores.

3. An Infobox or other semi-structured component for said targeted entity. A preferred embodiment through Wikipedia/MediaWiki provides an Infobox section of the main page for the entity, structured as show below.
   a. an unstructured text component for the targeted entity. The preferred embodiment through Wikipedia/MediaWiki is the main article portion of the HTML page for the entity.
   b. other associated information such as links and references, etc., for the targeted entity.

A preferred embodiment through Wikipedia/MediaWiki provides sections at the bottom of the HTML page for the entity labeled "See Also", "References" and "External Links," with a standard structure that can be easily parsed into components for ingestion into network format or generated from network format.

4. One or more entity type pages for the focused entity page and its various sub-components as described above. A preferred embodiment through Wikipedia/MediaWiki provides a standard naming scheme for combining the URL form of the Wiki word for the entity along with the word "Template" to get to the corresponding entity type page.

Components of Embodiments of the Disclosed System Connected to and Interacting with the Above Infrastructure Components through their Interfaces Various aspects of the present embodiments may be implemented in the form of one or more modules comprising software, hardware, or hardware and software combinations. This may be done in a variety of embodiments that include various functionality associated with one or more of these modules as is further described below. In particular, the modules described below are configured generally to support various aspects of the following:

1) Connection between a semantic network, typically through a semantic network editing program, and a knowledge sharing repository.

2) Having established a connection, data stored in the semantic network (such as data defining the previously described semantic networks/knowledge sharing repositories) may be manually or automatically transferred to the knowledge sharing repository and then used to update data/pages in the knowledge sharing repository based on the semantic network. For example, computer system 1 may be configured to automatically update information based on any changes in the semantic network, periodically, or by other methods of automation. Alternately, computer 1 may be configured to allow a user to initiate transferring data and updating the knowledge sharing repository based on user input.

3) Likewise, data from the knowledge sharing repository may also be transferred to the semantic network editing program to be used to update the semantic network based at least in part on the data/knowledge sharing network pages. This may also be done automatically or manually by a user.

In addition, in some embodiments, the techniques described herein may also be used to create a new knowledge sharing repository from data contained in a semantic network or vice-versa.

The various embodiments shown below may be used to facilitate connection and transfer of data between a semantic network and a knowledge sharing repository. In various embodiments, one or more of these various modules 520 (shown as specific modules 521-540 in FIG. 5b) may be incorporated in implementations of the disclosed systems and methods. Although modules 521-540 are shown for purposes of explanation, it is noted that equivalent or similar functionality may be provided by other implementations, and therefore the disclosure is not limited to the specific module examples shown.

Additional details of these exemplary modules and their associated functionality is provided below.

Module 1 (Entity Access Module).

Figure 5B:
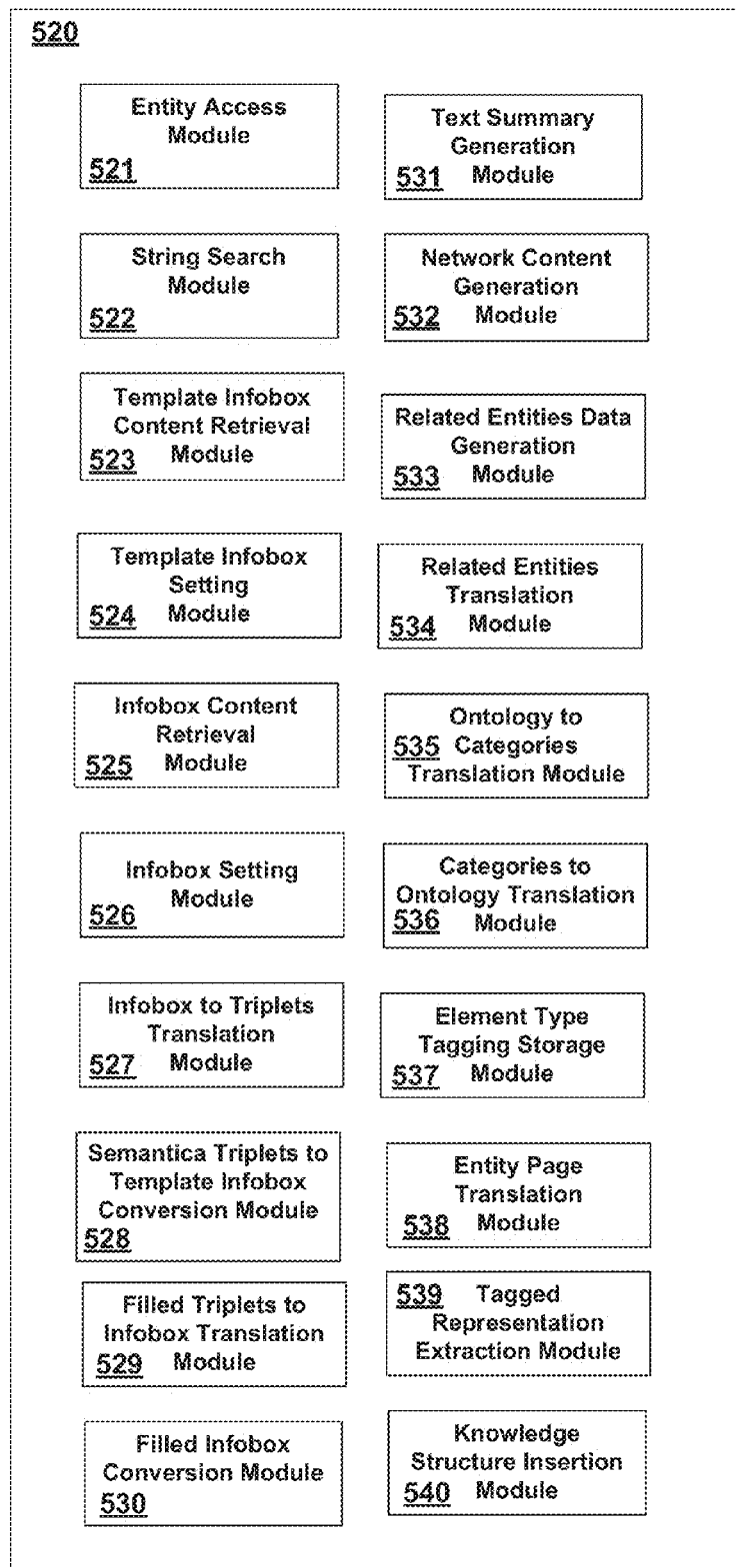
FIG. 5b is an illustration of a set of functional modules that may comprise various embodiments of the disclosure.

This module may be used to facilitate accessing a knowledge sharing repository page associated with a selected entity (also referred to herein as "Entity Access Module," as illustrated by module 521 of FIG. 5b). This module is configured to allow a user to connect to and access a knowledge sharing repository page through or in conjunction with a semantic network editing program, such as Semantica® software applications, either directly, through a plug-in, or via an external connections, such as through an API.

Figure 4A:
FIG. 4a is an illustration of an example entity page from the online Wikipedia knowledge sharing repository.
Figure 4D:
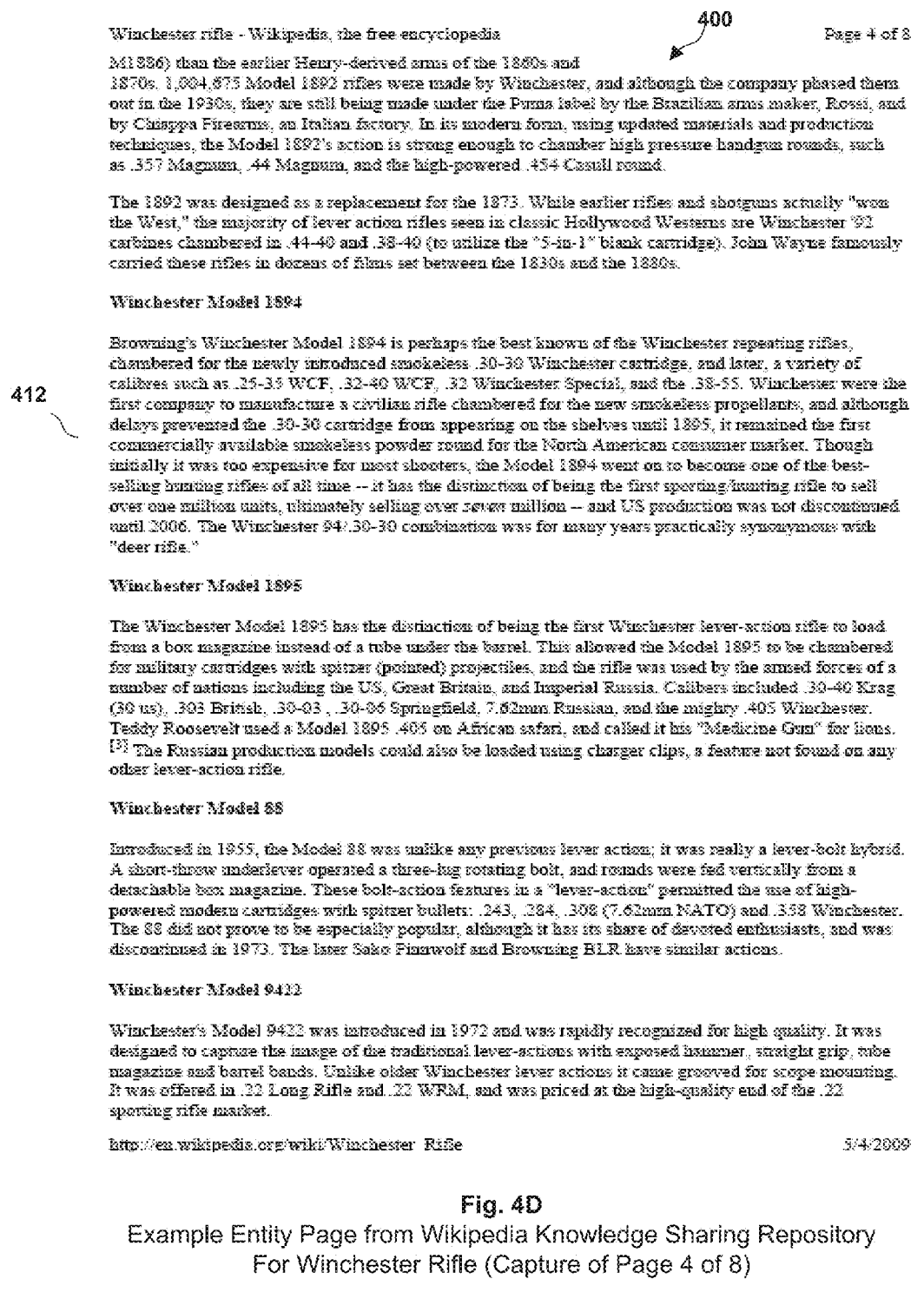
Figure 4I:
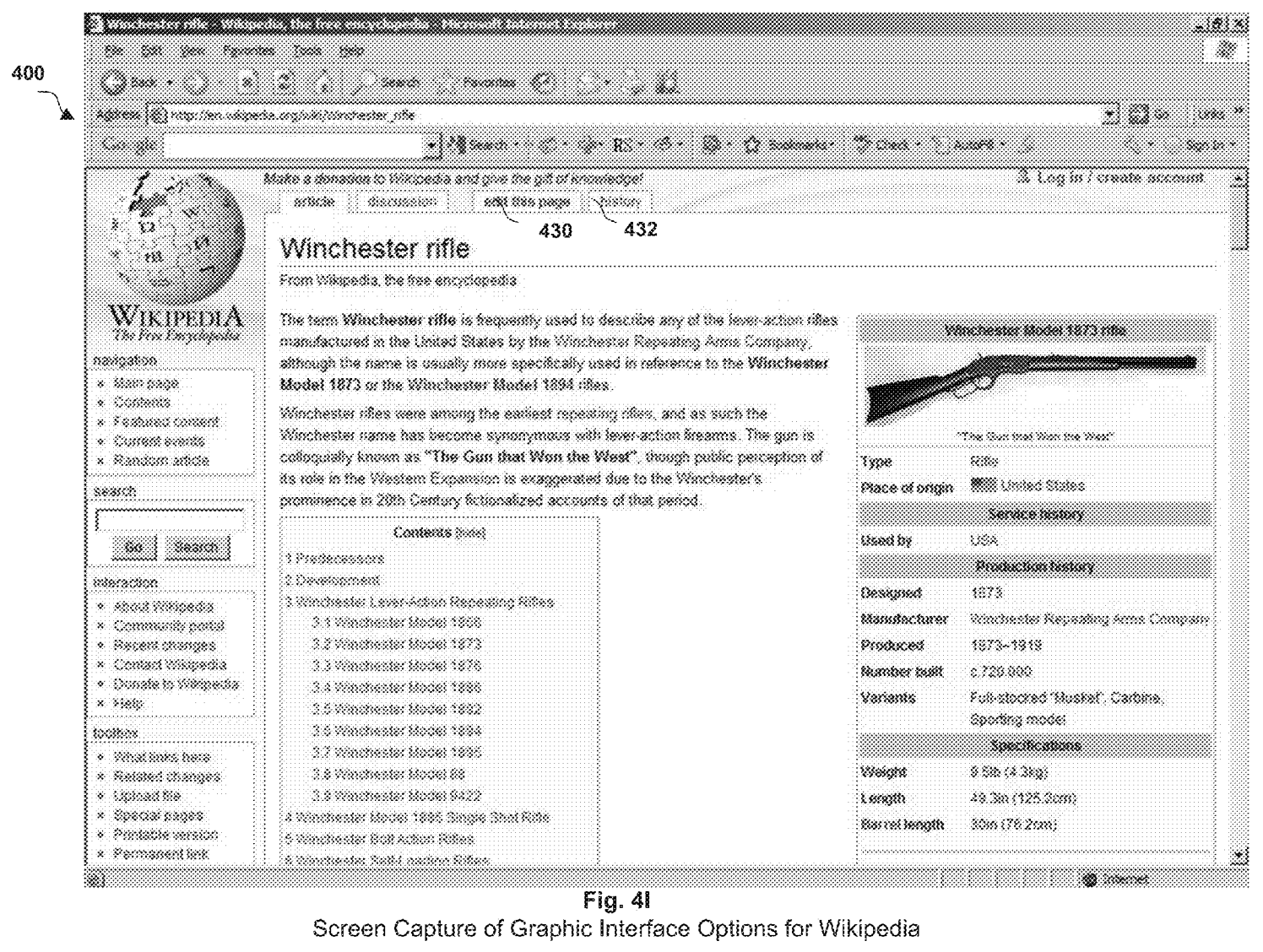
Figure 4J:
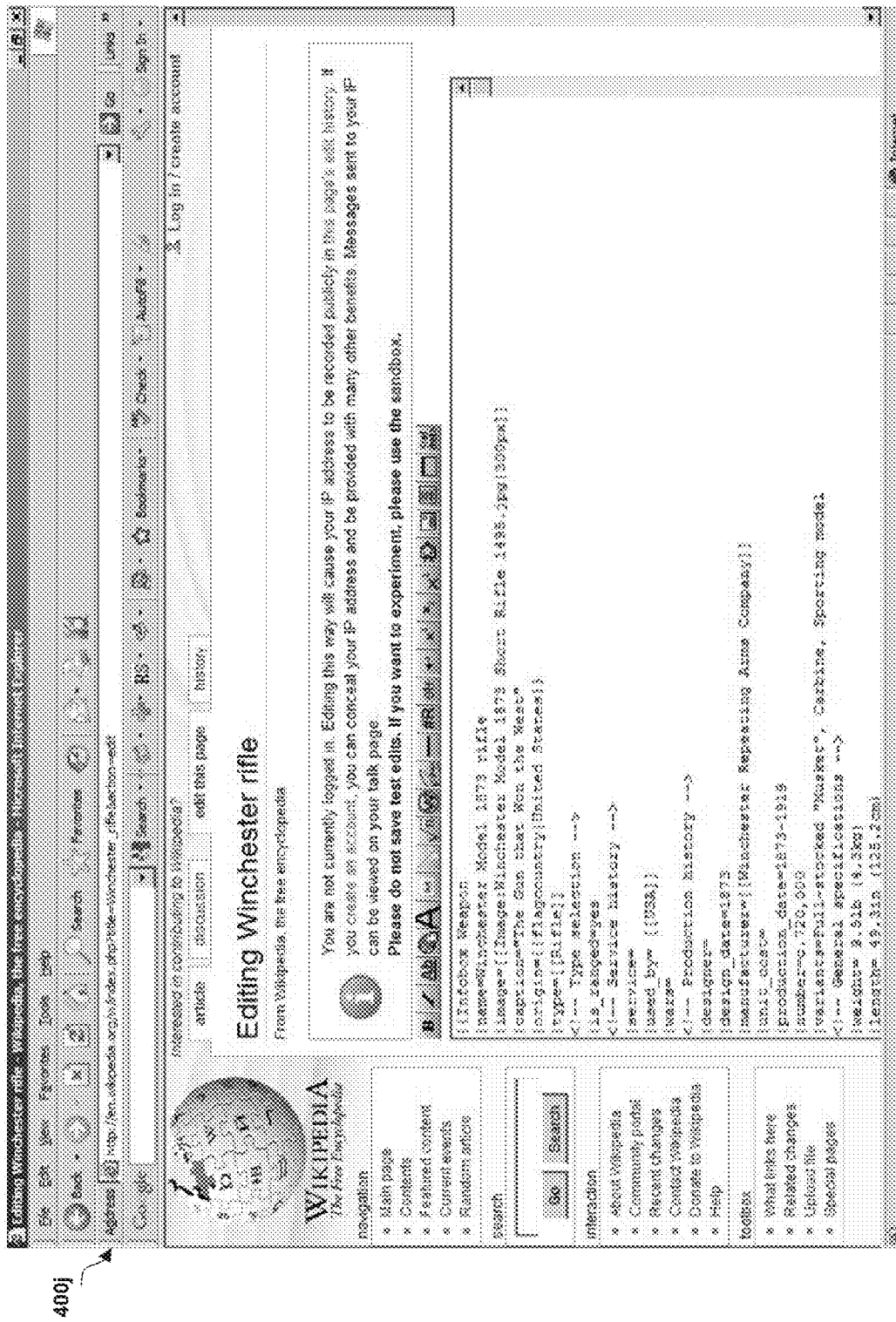
FIG. 4j shows an example screen capture of the editing page for the Winchester Rifle web page.
Figure 4K:
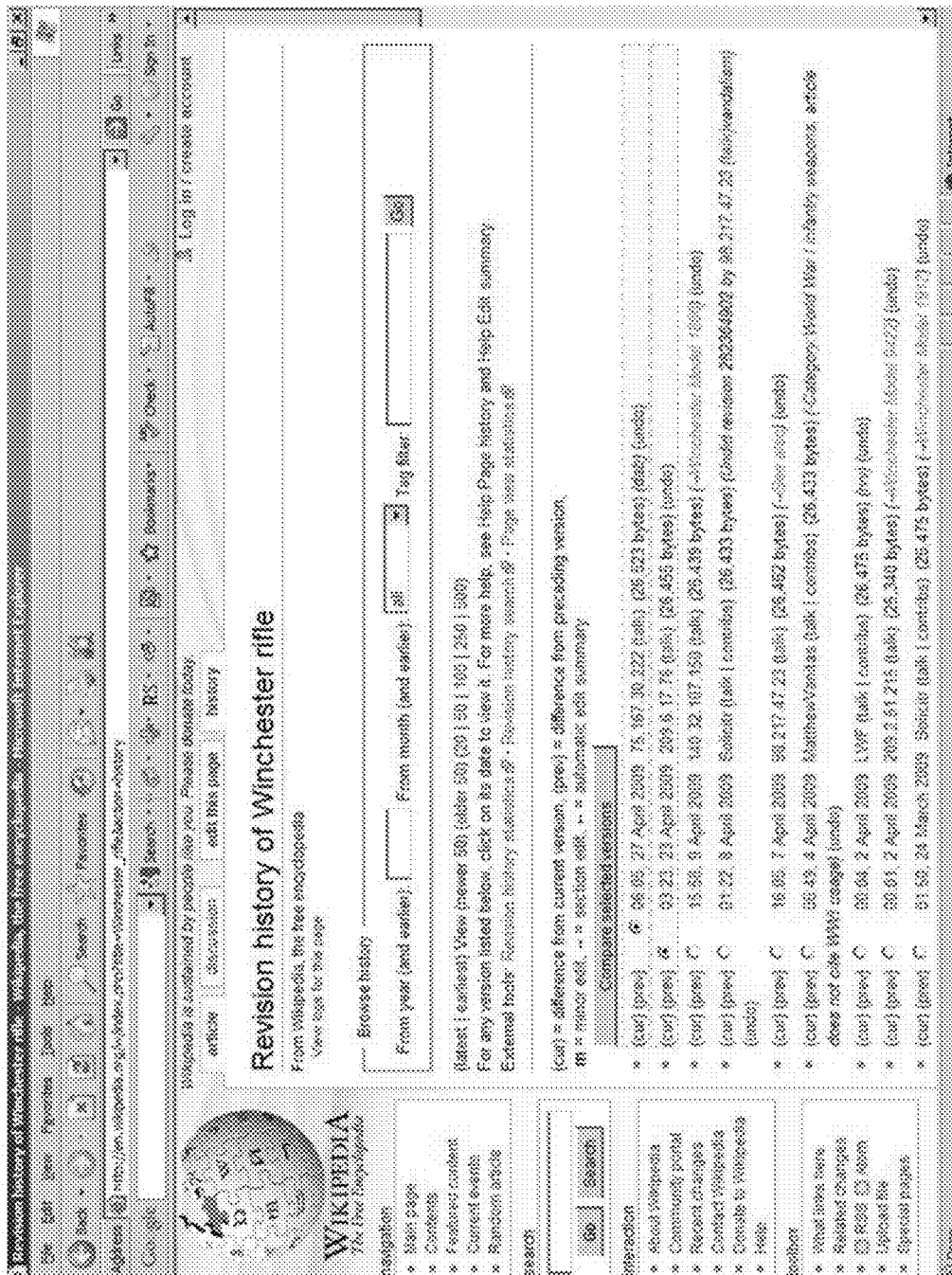
FIG. 4k shows an example screen capture of the journal/history page for the Winchester Rifle web page.

In a preferred embodiment, the Entity Access Module inserts the name of the entity into the URL (or other access protocol or mechanism) to access a single page of the knowledge sharing repository (for example, to access a single Wikipedia web page, such as the web page for the entity Winchester Rifle as shown in FIG. 4a) and uses the HTTP protocol or other secure or non-secure network communications mechanisms to load the page. For example, to access this web page, the entity insertion module would generate a URL as follows:

http://en.wikipedia.org/wiki/Winchester_Rifle

A simpler but less general implementation of this module can be used with knowledge sharing repositories that provide an Application Program Interface (API) that includes a system call for retrieving a particular entity's page by name. In this case, the API's system call may be invoked and the page then loaded.

Module 2 (String Search Module).

Figure 11:
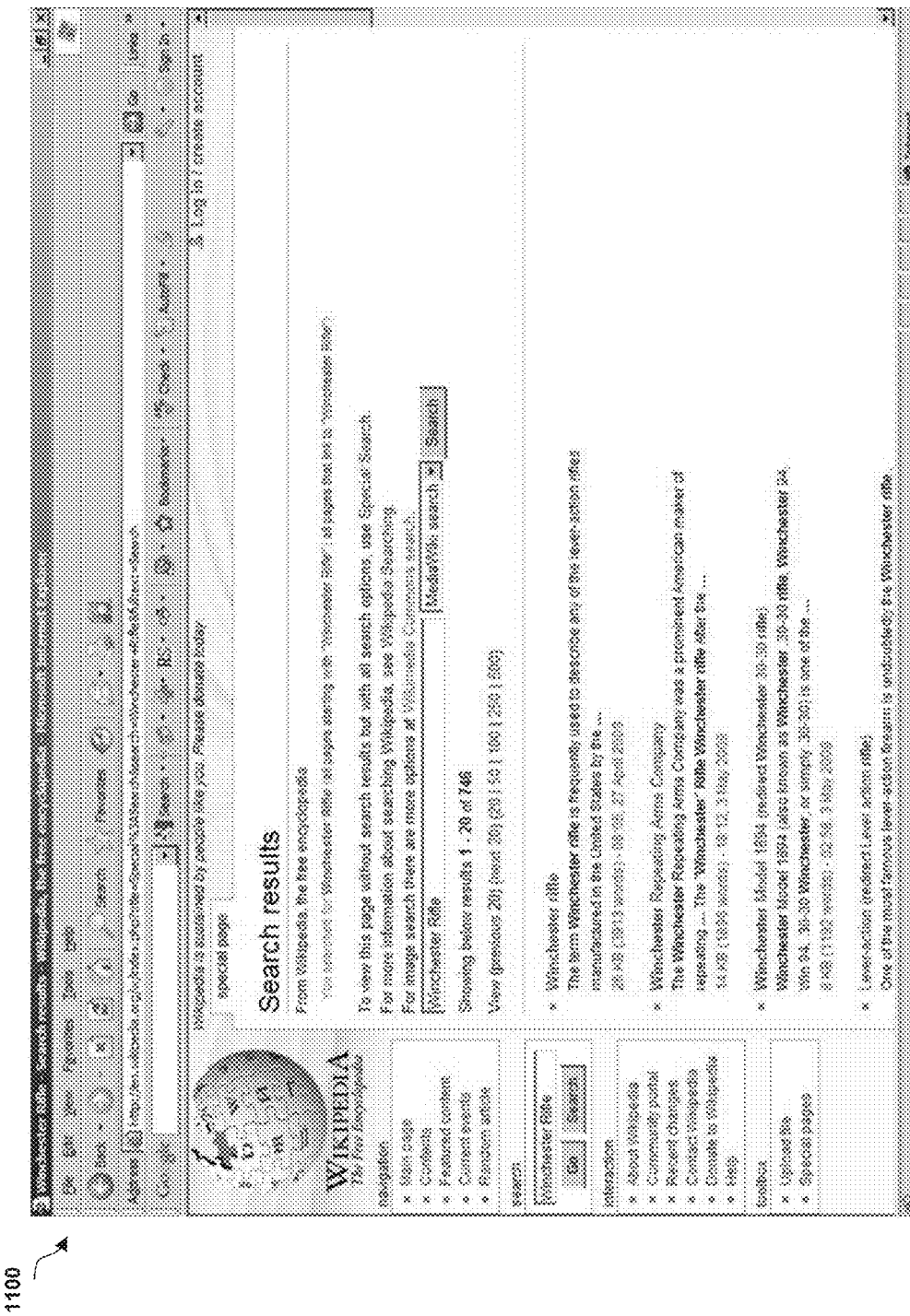
FIG. 11 is an illustration of a screen capture of an example search result.

This module may be used to facilitate searching a knowledge sharing repository for pages about a selected string (also referred to herein as a "String Search Module," as illustrated by module 522 of FIG. 5b). In a preferred embodiment, the String Search Module uses a known or provided knowledge sharing repository search mechanism (assuming one exists) through arguments on the home page URL of the knowledge sharing repository to search for a relevant page, load the result page, and parse it to provide the user with a choice of a page or pages to navigate to. For example, in Wikipedia, this module would generate the URL:

http://en.wikipedia.org/wiki/Main_Page with the term "Winchester Rifle" inserted in a search box on the referenced web page, resulting in the search results shown in FIG. 11.

A simpler but less general implementation of this module can be used with knowledge sharing repositories that provide an API that includes a system call for searching the knowledge sharing repository for a particular string.

Module 3 (Template Infobox Content Retrieval Module).

This module may be used for retrieving the knowledge sharing repository Template Infobox contents for a particular entity's page (also referred to herein as a "Template Infobox Content Retrieval Module," as illustrated by module 523 of FIG. 5b). In a preferred embodiment, the Template Infobox Content Retrieval Module inserts the name of the entity into the URL (or other access protocol) for accessing a Template Infobox for the desired page of the knowledge sharing repository, and uses the HTTP protocol or other secure or non-secure network communications mechanism to load the page. It then extracts the contents of the Template Infobox.

A simpler but less general implementation of this module can be used with knowledge sharing repositories that provide an API that includes a system call for retrieving the contents of the knowledge sharing repository Template Infobox for a particular entity's page.

Figure 6:
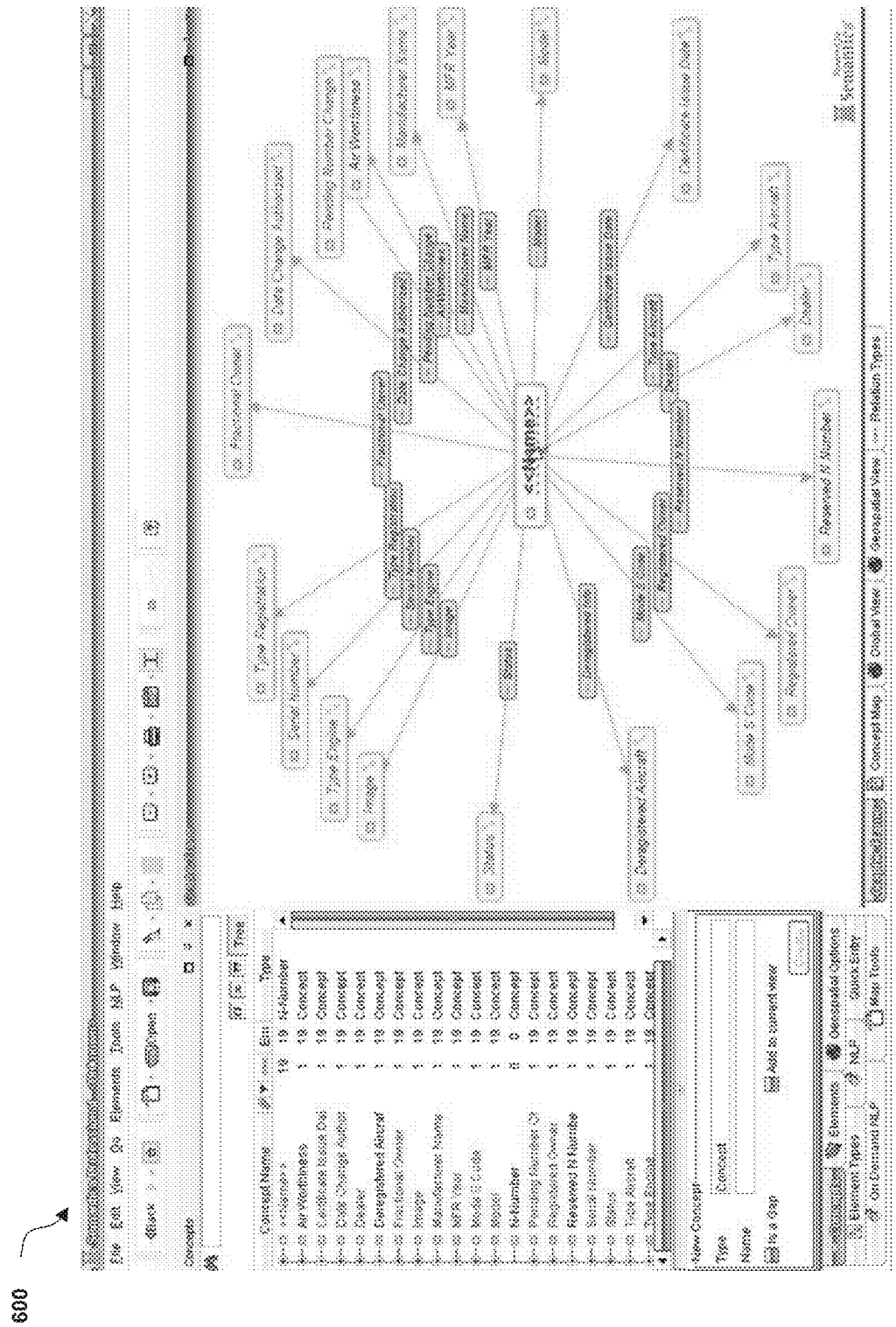
FIG. 6 is an example illustration of a translation of a Template Infobox to Semantica® content in accordance with aspects of the disclosure.

As one example, for an airplane tail number (or N-Number) in Wikipedia, the relevant web page's URL is:

http://en.wikipedia.org/w/index.php?title=Template:Infobox_N-Number&action=edit and one possible set of content in the edit box might be as shown in FIG. 6, which illustrates a translation of this information to Semantica® content. In this example, the information defines various properties or attribute values that a user might want to gather to describe an airplane.

Module 4 (Template Infobox Setting Module).

This module may be used to set the knowledge sharing repository Template Infobox for a knowledge sharing repository page (also referred to herein as a "Template Infobox Setting Module," as illustrated by module 524 of FIG. 5b). In a preferred embodiment, the Template Infobox Setting Module inserts the name of the entity into the URL (or other access protocol) for accessing a Template Infobox for the desired page of the knowledge sharing repository, and uses the HTTP protocol or other secure or non-secure network communications mechanism to upload a new version of the page with the new Template Infobox included in it.

A simpler but less general implementation of this module can be used with knowledge sharing repositories that provide an API that includes a system call for setting the contents of the knowledge sharing repository Template Infobox for a particular entity's page.

Module 5 (Infobox Content Retrieval Module).

This module may be used to retrieve the knowledge sharing repository Infobox contents for a knowledge sharing repository page (also referred to herein as an "Infobox Content Retrieval Module," as illustrated by Module 525 of FIG. 5b). In a preferred embodiment, the Infobox Content Retrieval Module inserts the name of the entity into the URL (or other access protocol) for accessing an Infobox for the desired page of the knowledge sharing repository, and uses the HTTP protocol or other secure or non-secure network communications mechanism to load the page. It then extracts the contents of the Infobox.

A simpler but less general implementation of this module can be used with knowledge sharing repositories providing an API that includes a system call for retrieving the contents of the knowledge sharing repository Infobox for a particular entity's page.

Module 6 (Infobox Setting Module).

This module may be used to set the knowledge sharing repository Infobox for a knowledge sharing repository page (also referred to herein as an "Infobox Setting Module," as illustrated by Module 526 of FIG. 5b). In a preferred embodiment, the Infobox Setting Module inserts the name of the entity into the URL (or other access protocol) for accessing an Infobox for the desired page of the knowledge sharing repository, and uses the HTTP protocol or other network secure or non-secure communications mechanism to upload a new version of the page with the new Infobox in it.

A simpler but less general implementation of this module can be used with knowledge sharing repositories that provide an API that includes a system call for setting the contents of the knowledge sharing repository Infobox for a particular entity's page.

Module 7 (Infobox to Triplets Translation Module).

This module may be used to translate a knowledge sharing repository Template Infobox into semantic network/knowledge structure triplets and thence to a knowledge structure template with gaps for values (also referred to herein as an "Infobox Translation Module," as illustrated by Module 527 of FIG. 5*b*). For example, a typical Template Infobox for a category of entity in a knowledge sharing repository is shown below (This example is for the topic or entity "Weapon" in Wikipedia):

{{Infobox Weapon
|name=
|image=
|caption=
|origin=
|type=
<!-- Type selection -->
|is_ranged=
|is_bladed=
|is_explosive=
|is_artillery=
|is_vehicle=
|is_missile=
|is_UK=
<!-- Service history -->
|service=
|used_by=
|wars=
<!-- Production history -->
|designer=
|design_date=
|manufacturer=
|unit_cost=
|production_date=
|number=
|variants=
<!-- General specifications -->
|spec_label=
|weight=
|length=
|part_length=
|width=
|height=
|diameter=
|crew=
<!-- Ranged weapon specifications -->
|cartridge=
|caliber=
|barrels=
|action=
|rate=
|velocity=
|range=
|max_range=
|feed=
|sights=
<!-- Artillery specifications -->
|breech=
|recoil=
|carriage=
|elevation=
|traverse=
<!-- Bladed weapon specifications -->
|blade_type=
|hilt_type=
|sheath_type=
|head_type=
|haft_type=
<!-- Explosive specifications -->
|filling=
|filling_weight=
|detonation=
|yield=
<!-- Vehicle/missile specifications -->
|armour=
|primary_armament=
|secondary_armament=
|engine=
|engine_power=
|pw_ratio=
|transmission=
|payload_capacity=
|suspension=
|clearance=
|wingspan=
|propellant=
|fuel_capacity=
|vehicle_range=
|ceiling=
|altitude=
|boost=
|speed=
|guidance=
|steering=
|accuracy=
|launch_platform=
|transport=
}}

Figure 7:
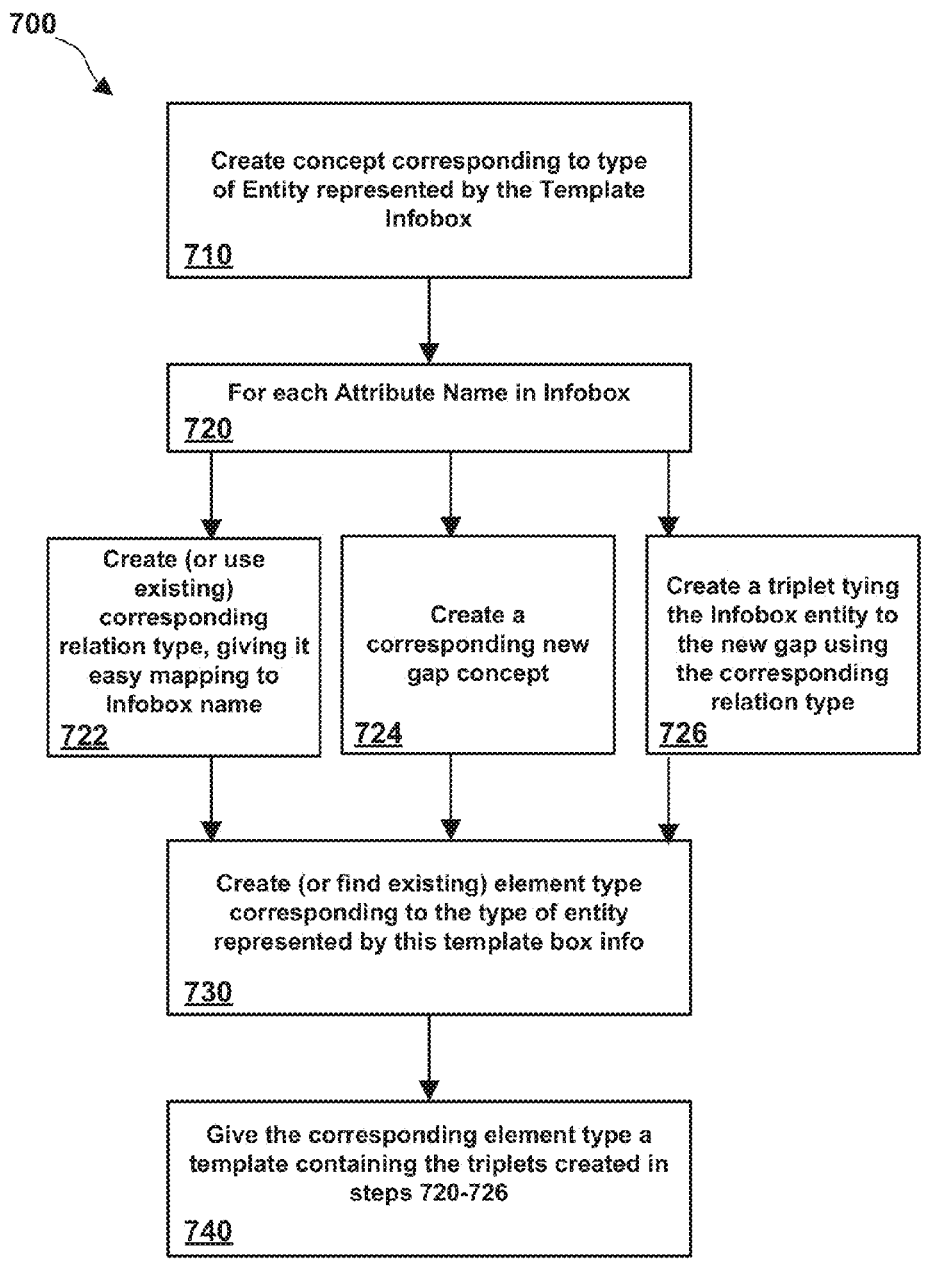
FIG. 7 is an illustration of an embodiment of infobox to triplets translation in accordance with aspects of the disclosure.

In an exemplary embodiment, the Infobox to Triplets Translation Module may be implemented using the process 700 as shown in FIG. 7 and described below:

i. Stage 710—Create a Concept corresponding to the type of entity represented by the Template Infobox.

ii. State 720—For each attribute name in the Infobox (for example, the attributes "name," "image," "caption," "origin," "type" . . . "transport" in the example Weapon Infobox above):

a. Stage 722—Create a (or use an existing) corresponding relation type, giving it a name that can be easily mapped back to the Infobox name, e.g., "has name", "has image" etc.

b. Stage 724—Create a corresponding new gap concept.

c. Stage 726—Create a triplet tying the Infobox entity to the new gap using the corresponding relation type.

iii. Stage 730—Create an (or find an existing) element type corresponding to the type of entity represented by this Template Info box iv. Stage 740—Give the corresponding element type a template containing the triplets created in step ii.

Module 8 (Semantica Template Triplets to Template Infobox Conversion Module).

This module may be used to translate a semantic network/knowledge structure template-related cluster of triplets into suitable content for a knowledge sharing repository Template Infobox (also referred to herein as a "Semantica Template Triplets to Template Infobox Conversion Module," as illustrated by Module 528 of FIG. 5*b*). It is noted that, while this module is described with respect to a Semantica data structure, in some embodiments it may also be used in conjunction with other semantic networks having a similar or equivalent structure.

In a preferred embodiment, this module converts a knowledge structure template into a new Template Infobox for a knowledge sharing repository entity that does not have one, or that needs updating or enhancing.

Figure 8:
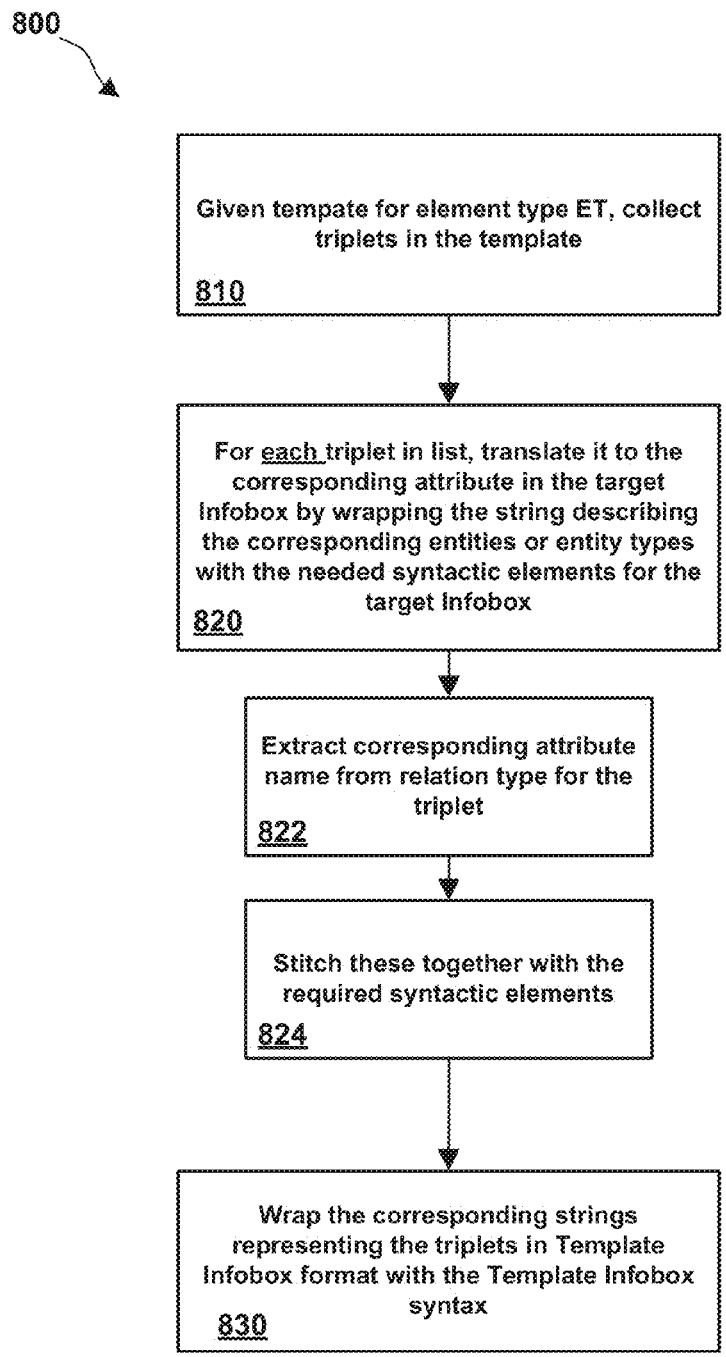
FIG. 8 is an illustration of an embodiment of conversion of Semantica Template Triplets to a Template Infobox in accordance with aspects of the disclosure.

In an exemplary embodiment, the module may be implemented using process 800 as shown in FIG. 8 and described below:

i. Stage 810—Given the template for a particular element type ET, collect the triplets in the template.

ii. Stage 820—For each triplet in this list, translate it to the corresponding attribute in the target Infobox by wrapping the string describing the corresponding entities or entity types with the needed syntactic elements for the target Infobox format:

a. Stage 822—Extract the corresponding attribute name from the relation type name for the triplet.

b. Stage 824—Stitch these together with the required syntactic elements, e.g., in a preferred embodiment for Wikipedia/MediaWiki, "|", attribute name, "=".

iii. Stage 830—Wrap the corresponding strings representing the triplets in Template Infobox format with the Template Infobox syntax, e.g., in a preferred embodiment for Wikipedia/MediaWiki, "{{Infobox Weapon" and "}}"

Module 9 (Filled Triplets to Infobox Translation Module).

This module may be used to translate a filled semantic network/knowledge structure template-related cluster of triplets into suitable content for a knowledge sharing repository Infobox for the related entity (also referred to herein as a "Filled Triplets to Infobox Translation Module," as illustrated by module 529 of FIG. 5b). In a preferred embodiment, a filled-in Weapon Infobox based on the template above looks like the following (the example shown is for the "M1 Garand rifle" from Wikipedia):

{{Infobox Weapon
    |name=Rifle, Caliber .30, M1
    |image=[[Image:Garand.jpg|300px]]
    |caption=
    |origin={{flagcountry|United States}}
    |type=[[Service rifle]]
    |is_ranged=yes
    |service=1936-1963
    (wars=[[World War II]], [[Korean War]], [[Vietnam War]] (limited)
    |used_by=See "[[M1 Garand rifle#Known operators|Known operators]]"
    |designer=[[John Garand|John C. Garand]]
    |design_date=1932
    |number=5.4 million approx <ref>{{cite web
      |url=http://www.scott-duff.com/WhoHowMany-When.htm
      |title=Who Made M1 Garands? How Many Were Made? When Were They Made?
      |author=Scott Duff
      |publisher=Excerpted from The M1 Garand: Owner's Guide copyright 1994 by Scott A. Duff
      |accessdate=2007-05-18}}</ref>
    |variants=M|C/D [[sniper rifle]]s
    |weight={{lb to kg|9.5|abbr=on|precision=1|wiki=yes}} to {{lb to kg|13.2|abbr=on|precision=1|wiki=yes}}
    |length={{in to mm|43.6|abbr=on|precision=0|wiki=yes}}
    |part_length={{in to mm|24|abbr=on|precision=0|wiki=yes}}
    |cartridge=[[0.30-06 Springfield]] (7.62×63 mm); <br />[[7.62×51 mm NATO]] (U.S. Navy & some commercial variants)
    |action=[[Gas-operated]], [[rotating bolt]]
    |rate=16-24 rounds/min effective
    |velocity={{convert|2800|ft/s|0|lk=on|sp=us|abbr=on}}
    |range={{convert|500|yd|0|lk=on|sp=us|abbr=on}}<ref>
      {{cite web
      |url=http://www.biggerhammer.net/manuals/tm9100522212/M1GARA.PDF
      |format=pdf
      |title=U.S. Department of the Army Technical Manual No. 9-1005-222-12, re-published by www.biggerhammer.net
      |date=[[17 march]] [[1969]]
      |accessdate=2007-05-18}}</ref>
    |feed=8-round "en bloc" [[Clip (ammunition)|clip]] internal [[Magazine (firearm)|magazine]]
    |sights=Aperture rear sight, barleycorn-type front sight
    }}

Figure 9:
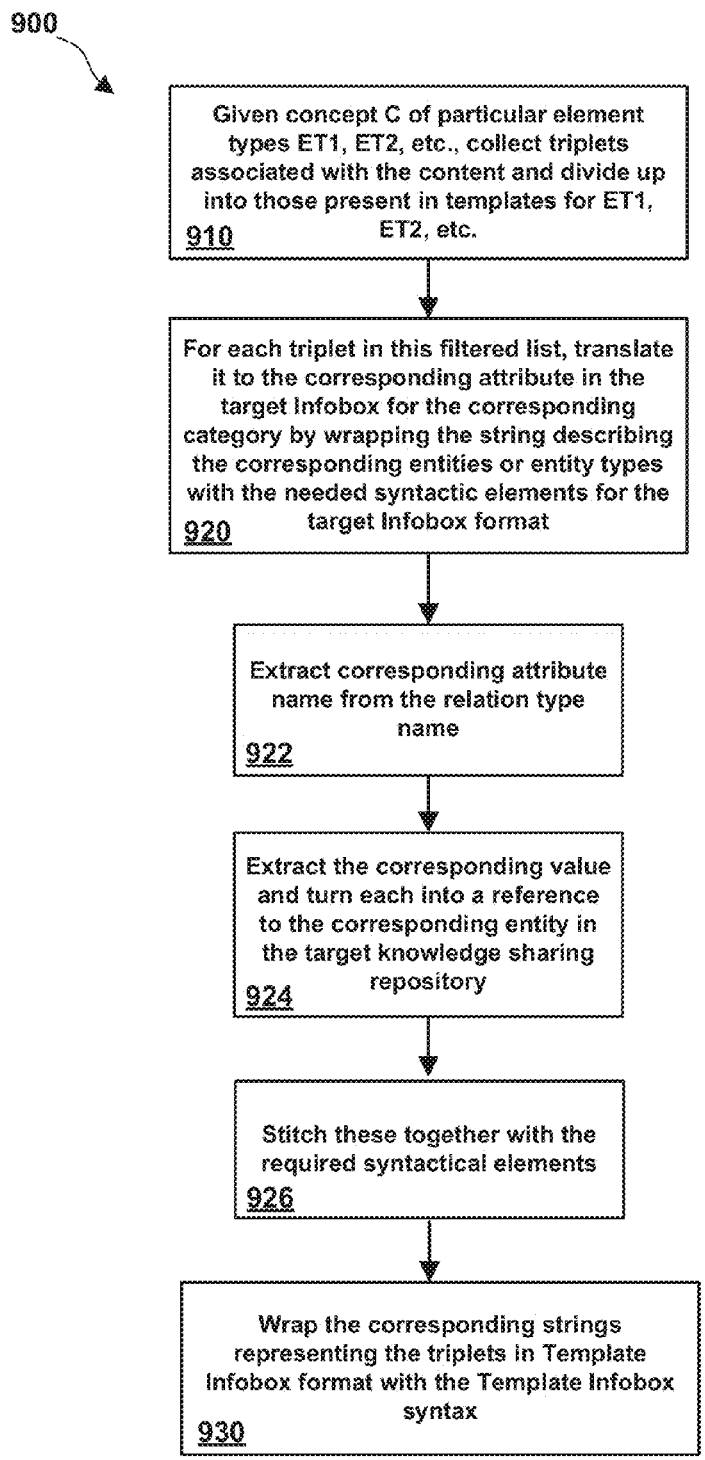
FIG. 9 is an illustration of an embodiment of conversion of a Filled Triplet to an Infobox in accordance with aspects of the disclosure.

In an exemplary embodiment, the Filled Triplets to Infobox Translation Module may be implemented using process 900 as shown in FIG. 9 and described below:

i. Stage 910—Given a concept C of particular element types ET1, ET2, ET3, etc., collect the triplets associated with the concept and divide them up into those present in the templates for ET1, ET2, ET3, etc.

ii. Stage 920—For each triplet in this filtered list, translate it to the corresponding attribute in the target Infobox for the corresponding category by wrapping the string describing the corresponding entities or entity types with the needed syntactic elements for the target Infobox format:

c. Stage 922—Extract the corresponding attribute name from the relation type name.

d. Stage 924—Extract the corresponding value (or values if there are multiple triplets using the same relation type) and turn each one into a reference to the corresponding entity in the target knowledge sharing repository, e.g., in the preferred embodiment for Wikipedia/MediaWiki, turning the element type "Service rifle" into the knowledge sharing repository reference "[[Service rifle]]" and a reference to an individual entity that has filled in a template such as "United States" into the knowledge sharing repository syntax for that template's Infobox, e.g., "{{flagcountry|United States}}".

e. Stage 926—Stitch these together with the required syntactic elements, e.g., in the preferred embodiment for Wikipedia/MediaWiki, "|", attribute name, "=", value string or list of value strings separated by commas.

iii. Stage 930—Wrap the corresponding strings representing the triplets in Infobox format with the Infobox syntax, e.g., in the preferred embodiment for Wikipedia/MediaWiki, "{{Infobox Weapon" and "}}".

Module 10 (Filled Infobox Conversion Module).

Figure 10:
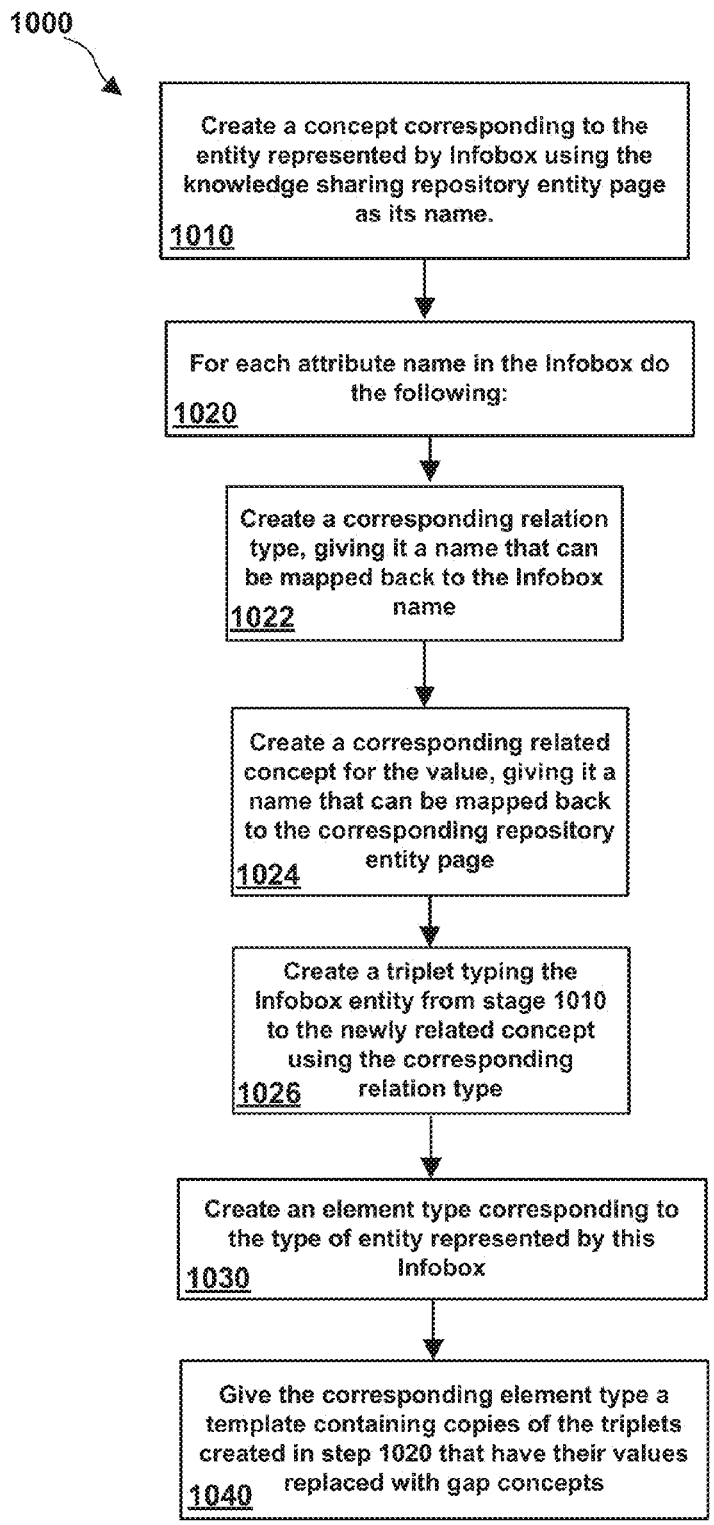
FIG. 10 is an illustration of an embodiment of conversion of a Filled Infobox to Triplets in accordance with aspects of the disclosure.

This module may be used to translate a filled Infobox for a single knowledge sharing repository entity into corresponding entities, entity types, and triplets in the semantic network/knowledge structure (also referred to herein as a "Filled Infobox Conversion Module," as illustrated by module 530 of FIG. 5b). In an exemplary embodiment, this module may be implemented by process 1000 as shown in FIG. 10 and described below:

i. Stage 1010—Create a concept corresponding to the entity represented by this Infobox using the knowledge sharing repository entity page name as its name.

ii. Stage 1020—For each attribute name in the Infobox (e.g., "name", "image", "caption", "origin", "type" . . . "transport" in the Weapon Infobox above)
  a. Stage 1022—Create a (or use an existing) corresponding relation type, giving it a name that can be easily mapped back to the Infobox name, e.g., "has name", "has image" etc.
  b. Stage 1024—Create a (or use an existing) corresponding related concept for the value, giving it a name that can be mapped back to the corresponding repository entity page.
  c. Stage 1026—Create a triplet tying the Infobox entity from step i) to the new related concept using the corresponding relation type.
iii. Stage 1030—Create an (or find an existing) element type corresponding to the type of entity represented by this Infobox.
iv. Stage 1040—Give the corresponding element type a template containing copies of the triplets created in step ii that have their values replaced with gap concepts.

Module 11 (Text Summary Generation Module).

This module may be used for generation of a text summary of selected content in a semantic network/knowledge structure, and inserting it into the main text of a knowledge sharing repository page for a selected entity for sharing with other users (also referred to herein as a "Text Summary Generation Module," as illustrated by module 531 of FIG. 5*b*).

This module may be implemented in a variety of ways to generate different kinds of usable text summaries, depending on the desired use of the text. Two specific implementations that have been shown to be useful are described below (it is noted, however, that the implementations described below are for purposes of explanation and not limitation, and therefore other implementations providing the same or equivalent functionality may also be used in various embodiments):

A. Raw material for sentences. The purpose of this form of text summary is as the starting point for massaging the contents of the selected contents of the knowledge structure into complete sentences and paragraphs in natural languages, as would be desired in a written report intended to be read by other persons. The process may be implemented using the following stages:
  i. Build up a string consisting of one substring for each triplet in the selected content built by concatenating the following with white space in between:
    a. The name of the first concept in the triplet.
    b. The name of the relation type in the triplet.
    c. The name of the second concept in the triplet.
  ii. Where the end of one triplet is the same as the beginning of the next triplet, remove the duplications, resulting in strings of concept, relation type, concept, relation type, concept, etc.

B. Raw material for triplet processing. The purpose of this form of text summary is to maintain the fundamentally networked form of the content for use by programs that can re-import that network. The process may be implemented using the following stages:
  i. Build up a string consisting of one substring for each triplet in the selected content built by concatenating the following with white space in between:
    a. The name of the first concept in the triplet, surrounded by appropriate repository-specific syntax or Wiki Markup for representing a link to the appropriate entity page in the knowledge sharing repository.
    b. The name of the relation type in the triplet.
    c. The name of the second concept in the triplet, surrounded by appropriate repository-specific syntax or Wiki Markup for representing a link to the appropriate entity page in the knowledge sharing repository.
  ii. Where the end of one triplet is the same as the beginning of the next triplet, remove the duplications, resulting in strings of entity-link, relation type, entity-link, relation type, entity-link, etc.

Module 12 (Network Content Document Generation Module).

This module facilitates generating a collection of reports and other network content documents (also referred to herein as a "Network Content Document Generation Module," as illustrated by module 532 as shown in FIG. 5*b*). This module may support content document generation from selected content in a semantic network and insertion of the content into a knowledge sharing repository Infobox for sharing with other users for their use in the network editing tool and other applications (such as those referenced elsewhere herein as well as other applications). These may include, but are not limited to, network-specification documents such as .SAR, .SARX, .XML and the like, pictures such as .JPG, .GIF, .PNG and the like, tabular formats such as tab-separated text, .CSV, .XSL, .XSLX and the like, geospatial representations such as .KML, .GMAP and the like, as well as other types of documents and associated knowledge objects (such as, for example, pictures 418 as shown in FIG. 4*b*). In a preferred embodiment, the Network Content Document Generation Module may be implemented by process stages as follows:
  i. Allow users to create a concept map or other subset of the entire knowledge structure containing the key information about the target entity, in one example including the directly connected triplets, but also containing any other triplets in the semantic network that they consider relevant.
  ii. Upon request by the user, transform, on a computer, this subset into any or all of the following:
    a. A JPEG, PNG, or other graphics formatted file containing the image of a concept map of the subset.
    b. One or more text summaries produced as in component 18 above.
    c. If the concept map contains geolocated-elements, a JPEG, PNG, or other graphics-formatted file containing the concept map of the subset drawn on a map of the earth.
    d. If the concept map contains temporally-located elements, an MPEG, WMV, AVI, QuickTime, or other video-formatted file depicting in video the changes in the concept map of the subset over the full time extent covered by the temporal information. This can be drawn in 2-D or 3-D or drawn on a map of the earth (or other 3-D space) as appropriate.
    e. If the concept map contains geolocated elements and/or temporally-located elements, a KML, GMAP, or other geospatially- and temporally-formatted file describing how the concept map of the subset should be drawn on a map of the earth (or other 3-D space) by any geospatial and/or temporal viewer such as, but not limited to, Google Earth, Microsoft Virtual Earth, ArcGIS, etc.
    f. An XML or other structured text format (including, but not limited to, RDF, OWL, etc.) for describing the concept map or subset in a form that can be imported into network editing tools.

g. Any of several custom or proprietary database-formatted files, including but not limited to 1) a SAR (Semantica ARchive) or other network editing tool's custom database format; or 2) a custom-schema database file for any database application, including but not limited to, postgreSQL, mySQL, Oracle, etc.; containing the concept map or subset for use by other users with applications that can open them.

h. Any of several open-schema spreadsheet or database-formatted files designed for the sharing of semantic network-like content, including but not limited to 1) a database file for any database application, including but not limited to, postgreSQL, mySQL, Oracle, etc. 2) an XSL, XSLX, CSV, or other spreadsheet-formatted file for sharing tabular data, containing the concept map or subset for use by other users with applications that can open them.

i. The entire content of the more complete knowledge structure within which the target entity exists (i.e., not a subset but the whole knowledge structure) stored in any of the formats listed in O-h) above.

Module 13 (Related Entities Data Generation Module).

This module may be used to generate sections for insertion into an entity's knowledge sharing repository page containing related entities for sections such as the "See Also" section (for example, as shown in Wikipedia at the bottom of a typical web page and as section 418 of FIG. 4g), references to publications for the "Reference" section (for example, section 420 of FIG. 4g), and external links to other web sites or repositories or other URI-accessible collections for the "External Links" section (for example, section 424 of FIG. 4h) from associated knowledge objects in the corresponding semantic network/knowledge structure (also referred to herein as a "Related Entities Generation Module," as illustrated by module 533 of FIG. 5b).

In an exemplary embodiment, a Related Data Generation Module may be implemented using the following process stages:

i. For the See Also section, find knowledge objects of type URL that are attached to the target entity and are marked with the "See Also" property and insert each such knowledge object's URL into a See Also section built in the repository's format for that section. Alternatively, if the concept to entity translation is preferred, or knowledge objects are fully capable of being entities, triplets whose relation type is "see also" can be found and URLs generated from the names of the entities, or the knowledge objects, on the other ends of those triplets.

ii. For the Reference section, find knowledge objects attached to the target entity that are marked with the "Reference" property and insert each such knowledge object's text into a Reference section built in the repository's format for that section. Alternatively, if it is preferred to represent references as concepts in the knowledge structure, or knowledge objects are fully capable of being entities, triplets whose relation type is "has reference" can be found and URLs generated from the names of the entities, or the knowledge objects, on the other ends of those triplets.

iii. For the External Links section, find knowledge objects of type URL that are attached to the target entity that are marked with the "External Link" property and insert each such knowledge object's text into a Reference section built in the repository's format for that section. Alternatively, if it is preferred to represent External links as concepts in the knowledge structure, or knowledge objects are fully capable of being entities, triplets whose relation type is "has reference" can be found and URLs generated from the names of the entities, or the knowledge objects, on the other ends of those triplets.

Module 14 (Related Entities Translation Module).

This module may be used to translate sections from an entity's knowledge sharing repository page containing related entities for sections such as the "See Also" section, references to publications for the "Reference" section, and external links to other web sites or repositories or other URI-accessible collections for the "External Links" section to associated knowledge objects in the corresponding semantic network/knowledge structure (also referred to herein as a "Related Entities Translation Module," as illustrated by module 534 of FIG. 5b). In an exemplary embodiment, this module may be implemented using the following process stages:

i. Extract the See Also section of the repository page, and turn each entity reference into a corresponding knowledge object or entity and attach with the necessary property or relation type as in the previous mechanism.

ii. Extract the Reference section of the repository page, and turn each document reference into a corresponding knowledge object or entity and attach with the necessary property or relation type as in the previous mechanism.

iii. Extract the External Links section of the repository page, and turn each link into a corresponding knowledge object or entity and attach with the necessary property or relation type as in the previous mechanism.

Module 15 (Ontology to Categories Translation Module).

This module may be used for translation of the organization of element types in a semantic network/knowledge structure's ontology to the knowledge sharing repository's categories and their (possibly) re-entrant hierarchical structure (also referred to herein as an "Ontology to Categories Translation Module," as illustrated by module 535 of FIG. 5b).

In an exemplary embodiment, this module may be implemented using the following process stages:

i. Starting with the root of the element type structure, perform a pre-order traversal of the element type structure, using either the built-in supertype/subtype mechanism, or a custom relation type such as "has supertype/has subtype", generating a new category page in the knowledge sharing repository for each element type if it does not already exist, or merging any missing associated information into the corresponding category page if it does exist. If the simplest traversal of the structure results in references to not-yet-existent pages being created and the particular knowledge sharing repository prevents this, then those insertions must be cached and deferred until the missing pages are generated. This results in a significantly greater amount of work as each page must be modified many times, so the preferred embodiment uses a repository that allows references to non-existent pages.

ii. A variation of this can be used when it is desirable to insert only the portion of the ontology that is needed to completely define a particular page. In this case, the traversal is limited to the subset of the element type structure that contains all possible paths back up the hierarchy to the root.

Module 16 (Categories to Ontology Translation Module).

This module may be used for translating a knowledge sharing repository's categories and their possibly-re-entrant hierarchical structure into corresponding elements in the semantic network/knowledge structure's ontology (also referred to herein as a "Categories to Ontology Translation Module," as illustrated by module 536 of FIG. 5b). In an exemplary embodiment, this module may be implemented using the following process stages:

i. Starting at the root of the category tree for the knowledge sharing repository, traverse the tree, using an already-visited cache to prevent revisits for re-entrant trees and caching forward references to non-existent types for later insertion for knowledge structures that prevent creation of temporary element types for later redefinition.

ii. For each category visited during the traversal:

a. Extract the portions of the category entity's page that define the current category b. If the corresponding element type exists in the knowledge structure, merge those portions into the existing element type; otherwise create a new element type with those portions.

c. Extract the subcategories from the category pages.

d. Create any of those subcategories that do not already exist in the knowledge structure if necessary, and then give the subcategory the current category as parent. When the network editing tool supports only a strict hierarchy in its built-in element type structure but allows triplets that tie two element types together, as in the current preferred embodiment, use a custom relation type such as "has supertype/has subtype" to store a non-hierarchical category structure to match a non-hierarchical ontology in the targeted knowledge sharing repository.

This module may also be configured to generate repository category pages for knowledge structure relation types to store definitions, examples, discussions, and the like of relation types in the repository.

Module 17 (Element Type Tagging Storage Module).

This module facilitates storing the assignments of element types to the elements in individual triplets from a semantic network/knowledge structure, or the pedigree/provenance of individual pieces of knowledge, by inserting a tagged representation of each element as text when they are generated into various sections of the knowledge sharing repository's pages, whether in text sections or in semi-structured sections (also referred to herein as an "Element Type Tagging Storage Module," as illustrated by module 537 of FIG. 5b).

In a preferred embodiment, this module may be implemented using the following process stages:

i. In the various text reports or semi-structured information inserted into the repository by other mechanisms, whenever a triplet would be inserted using the repository's markup system, use any of the available compatible tagging standards, including but not limited to XML, XHTML, etc., to tag the text of relation types. For example, in the preferred Wikipedia/Mediawiki embodiments, where other mechanisms would generate [[Tim]] has dog [[Sasha]].

instead generate

<person>[[Tim]]</person>
        <relationship>has dog</relationship>
        <dingo>[[Sasha]]</dingo> ii. Where desired, other knowledge structure content such as properties, provenance or other pedigree, icons, pictures, or other attached documents, etc. can be inserted using a similar tagging method, thus including more information into the text while leaving it human-readable. This allows the easy embedding of any information that needs to be re-acquired upon ingesting the repository page back into the knowledge structure, as in the next mechanism. For example, if the above triplet about Tim and Sasha was extracted from a particular unclassified document, it could be generated as <person fromDoc=123.doc classification=unclass>
        [[Tim]]</person>
        <relationship>has dog</relationship>
        <dingo>[[Sasha]]</dingo> iii. A special case and especially powerful use of this mechanism allows the embedding of tagged triplets associated with an entity into the text reports that can be allowed through some scripting code to display a preview when moused over of the triplets that will be seen if a reference to that entity is followed. For example, information that will be seen about Sasha might include:

<on-mouse-over source="TimAndSasha.sarx"
            action=getTriplets
            target="Sasha">
        <dingo>[[Sasha]]</dingo></on-mouse-over> which indicates to the scripting language that if the word Sasha is moused-over, then it should access the XML representation of the network in TimAndSasha.sarx and get the triplets associated with the target "Sasha"

Module 18 (Entity Page Translation Module).

This module facilitates translating unstructured knowledge sharing repository entity pages into semantic network/knowledge structure content (also referred to herein as an "Entity Page Translation Module," as illustrated by module 538 of FIG. 5b). This may be done by processing or parsing information not created to fit the standards of other elements of the disclosed system and method by parsing with either A) a natural language processing (NLP) entity or entity-and-relationship extraction engine, or B) parsing of other structured forms of tagging including but not limited to structured or semi-structured repository sections such as the See Also, References, Links and Categories sections, Wiki Structured tagging, RDF/OWL or other semantic web-oriented tagging methods, or presence of other tagging to indicate content relevant to knowledge structures such as element typing, triplets, provenance or pedigree, and other embedded references to other pages, offering the user choices of whether any or all of the available parsing methods are to be applied to a particular page or batch of pages. In a preferred embodiment this module may be implemented using the following process stages:

i. Whenever the network editing tool is asked to ingest the repository page for a particular entity, or any suitably marked up text, the user is offered a choice of kinds of information to be looked for.

ii. The chosen text is then parsed to find any of the kinds of tagging chosen; or in the case of the choice to use an NLP engine, all of the chosen text is passed to the NLP engine for conversion to a usable tagged representation.

iii. The resulting tagged text extracted either directly from the source text or received from the NLP engine is then translated into knowledge structure content.

iv. Specific sections of a repository page are processed as described in other mechanisms here, or as appropriate in translating from other structured or marked up text to knowledge structure content following the patterns established by the descriptions above, or standards developed for interpreting such structure as representing properties or network structures.

Module 19 (Tagged Representation Extraction Module).

This module facilitates extracting tagged representations for element types in triplets from various sections of a knowledge sharing repository to recreate and present them in a knowledge structure for viewing, analysis and editing with the network editing tool (also referred to herein as a "Tagged Representation Extraction Module," as illustrated by module 519 of FIG. 5). In a preferred embodiment, this module may be implemented using the following stages:
  i. Whenever the network editing tool is asked to ingest the repository page for a particular entity, it parses the page to find any of the tagging inserted by processes such as described in previous mechanisms above.
  ii. Any such tagging is further parsed and translated into content such as triplets, properties, provenance, pedigree, element types, etc. to be added to the resulting knowledge structure.

Module 20 (Knowledge Structure Insertion Module).

This module facilitates inserting or merging an entire semantic network/knowledge structure, or a selected subset of it, into a collection of corresponding entity pages in the knowledge sharing repository (also referred to herein as a "Knowledge Structure Insertion Module," as illustrated by module 540 of FIG. 5b). In a preferred embodiment, this module may be implemented using the following process stages:
  i. Whenever the network editing tool is asked to merge the knowledge structure or a selected subset, a traversal of the element types underlying the selected content, followed by a traversal of the entities results in a sequence of repository pages to be produced, is performed.
  ii. Each entity's page is then generated using the mechanisms described above. To avoid extra work, dates and other provenance included in the knowledge structure and the repository pages are used to determine whether each entity is new or otherwise modified and only new information is inserted.
  iii. Where the entities for the other end of a particular triplet correspond to a value being needed in the other entity's page also, this is repeated for the corresponding other entity's page.

Sample data products generated by a disclosed embodiment are provided below.

Sample Data Products Generated from an Embodiment of the System Disclosed

Infobox:
{{Infobox TailNumber
|name=[[N41HA]]
|Registered Owner=[[PROSCH HANS E]]
|aircraft Type=[[Lockheed JetStar]]<br>[[Lockheed L-1329 Jetstar]]<br>[[Gulfstream Aerospace G-IV Gulfstream IV]]
|Status=[[Valid]]
|Type Aircraft=[[Fixed Wing Multi-Engine]]
|Model=[[AEROSTAR 601P]]
|Type Engine=[[Reciprocating]]
|Mode S Code=[[51151167]]
|operator=[[Federal Aviation Administration (FAA)]]
|Date Change Authorized=[[None]]
|Fractional Owner=[[NO]]
|seen at airport=[[Denver—Stapleton International (DEN/KDEN)—closed-]]
|Dealer=[[No]]
|AirWorthines=[[Air Worthiness]]
|Pending Number Change=[[None]]
|Reserved N Number=[[Reserved N Number]]
|Certificate Issue Date=[[Aug. 23, 2000]]
|Type Registration=[[Individual]]
|related=[[Concept 196]]
|MFR Year=[[1975]]
|Serial Number=[[61P-0263-052]]
|Deregistered Info=[[Deregistered Aircraft]]
|Manufacturer Name=[[SMITH]]
}}

The CSS Semantica generates that allows us to show that infobox, saved as the N-Number Template, which is derived from the class Infobox, provided by MediaWiki:
{|class="infobox" style="width: 258px; font-size: 90%; text-align: left;"
<tr><td colspan="2" style="text-align: center;"><b>{{{name}}}</b></td></tr><tr><th style="background-color: #eeeeee; white-space: nowrap">Registered Owner</th><td>{{{Registered Owner}}}</td></tr><tr><th style="background-color: #eeeeee; white-space: nowrap">aircraft Type</th><td>{{{aircraft Type}}}</td></tr><tr><th style="background-color: #eeeeee; white-space: nowrap">Status</th><td>{{{Status}}}</td></tr><tr><th style="background-color: #eeeeee; white-space: nowrap">Type Aircraft</th><td>{{{Type Aircraft}}}</td></tr><tr><th style="background-color: #eeeeee; white-space: nowrap">Model</th><td>{{{Model}}}</td></tr><tr><th style="background-color: #eeeeee; white-space: nowrap">Type Engine</th><td>{{{Type Engine}}}</td></tr><tr><th style="background-color: #eeeeee; white-space: nowrap">Mode S Code</th><td>{{{Mode S Code}}}</td></tr><tr><th style="background-color: #eeeeee; white-space: nowrap">operator</th><td>{{{operator}}}</td></tr><tr><th style="background-color: #eeeeee; white-space: nowrap">Date Change Authorized</th><td>{{{Date Change Authorized}}}</td></tr><tr><th style="background-color: #eeeeee; white-space: nowrap">Fractional Owner</th><td>{{{Fractional Owner}}}</td></tr><tr><th style="background-color: #eeeeee; white-space: nowrap">seen at airport</th><td>{{{seen at airport}}}</td></tr><tr><th style="background-color: #eeeeee; white-space: nowrap">Dealer</th><td>{{{Dealer}}}</td></tr><tr><th style="background-color: #eeeeee; white-space: nowrap">AirWorthines</th><td>{{{AirWorthines}}}</td></tr><tr><th style="background-color: #eeeeee; white-space: nowrap">Pending Number Change</th><td>{{{Pending Number Change}}}</td></tr><tr><th style="background-color: #eeeeee; white-space: nowrap">Reserved N Number</th><td>{{{Reserved N Number}}}</td></tr><tr><th style="background-color: #eeeeee; white-space: nowrap">Certificate Issue Date</th><td>{{{Certificate Issue Date}}}</td></tr><tr><th style="background-color: #eeeeee; white-space: nowrap">Type Registration</th><td>{{{Type Registration}}}</td></tr><tr><th style="background-color: #eeeeee; white-space: nowrap">related</th><td>{{{related}}}</td></tr><tr><th style="background-color: #eeeeee; white-space: nowrap">MFR Year</th><td>{{{MFR Year}}}</td></tr><tr><th style="background-color: #eeeeee; white-space: nowrap">Serial Number</th><td>{{{Serial Number}}}</td></tr><tr><th style="background-color: #eeeeee; white-space: nowrap">Deregistered Info</th><td>{{{Deregistered Info}}}</td></tr><tr><th style="background-color: #eeeeee; white-space: nowrap">Manufacturer Name</th><td>{{{Manufacturer Name}}}</td></tr>|}
<noinclude>
{{Infobox N-Number
|name=[[N41HA]]

|Registered Owner=[[PROSCH HANS E]]
aircraft Type=[[Lockheed JetStar]]<br>[[Lockheed L-1329 Jetstar]]<br>[[Gulfstream Aerospace G-IV Gulfstream IV]]
|Status=[[Valid]]
|Type Aircraft=[[Fixed Wing Multi-Engine]]
Model=[[AEROSTAR 601P]]
|Type Engine=[[Reciprocating]]
Mode S Code=[[51151167]]
|operator=[[Federal Aviation Administration (FAA)]]
|Date Change Authorized=[[None]]
|Fractional Owner=[[NO]]
|seen at airport=[[Denver—Stapleton International (DEN/KDEN)—closed-]]
|Dealer=[[No]]
|AirWorthines=[[Air Worthiness]]
|Pending Number Change=[[None]]
|Reserved N Number=[[Reserved N Number]]
|Certificate Issue Date=[[Aug. 23, 2000]]
|Type Registration=[[Individual]]
|related=[[Concept 196]]
|MFR Year=[[1975]]
|Serial Number=[[61P-0263-052]]
|Deregistered Info=[[Deregistered Aircraft]]
|Manufacturer Name=[[SMITH]]
}}
</noinclude>

It is noted that in various embodiments the presently disclosed system and method relate to one or more processes such as are described and/or illustrated herein. These processes are typically implemented in one or more modules as are described herein, and such modules may include computer software stored on a computer readable medium including instructions configured to be executed by one or more processors and/or associated process steps or stages. It is further noted that, while the processes described and illustrated herein may include particular steps or stages, it is apparent that other processes including fewer, more, or different stages than those described and shown are also within the spirit and scope of the present disclosure. Accordingly, as noted previously, the processes and associated modules shown herein are provided for purposes of illustration, not limitation.

Some embodiments of the present system and method may include computer software and/or computer hardware/software combinations configured to implement one or more processes or functions such as those described herein. These embodiments may be in the form of modules implementing functionality in software and/or hardware software combinations. Embodiments may also take the form of a computer storage product with a computer-readable medium having computer code thereon for performing various computer-implemented operations, such as operations related to functionality as describe herein. The media and computer code may be those specially designed and constructed for the purposes described herein, or they may be of the kind well known and available to those having skill in the computer software arts, or they may be a combination of both.

Examples of computer-readable media within the spirit and scope of the present disclosure include, but are not limited to: magnetic media such as hard disks; optical media such as CD-ROMs, DVDs and holographic devices; magneto-optical media; and hardware devices that are specially configured to store and execute program code, such as programmable microcontrollers, application-specific integrated circuits ("ASICs"), programmable logic devices ("PLDs") and ROM and RAM devices. Examples of computer code may include machine code, such as produced by a compiler or other machine code generation mechanisms, scripting programs, PostScript programs, and/or other code or files containing higher-level code that are executed by a computer using an interpreter or other code execution mechanism.

Computer code may be comprised of one or more modules executing a particular process or processes to provide useful results, and the modules may communicate with one another via means known or developed in the art. For example, certain embodiments disclosed herein may be implemented using assembly language, Java, C, C#, C++, scripting languages, and/or other programming languages and software development tools as are known or developed in the art. Other embodiments may be implemented in hardwired circuitry in place of, or in combination with, machine-executable software instructions.

The foregoing description, for purposes of explanation, used specific nomenclature to provide a thorough understanding of the disclosure. However, it will be apparent to one skilled in the art that specific details are not required in order to practice the disclosed systems and methods. Thus, the foregoing descriptions of specific embodiments are presented for purposes of illustration and description. They are not intended to be exhaustive or to limit the claims to the precise forms disclosed; obviously, many modifications and variations are possible in view of the above teachings. The embodiments were chosen and described in order to best explain the disclosed principles of their practical applications. They thereby enable others skilled in the art to best utilize such principals and various embodiments with various modifications as are suited to the particular use contemplated. It is intended that the following claims and their equivalents define the scope of the teachings presented herein.

We claim:

1. A computer implemented method of sharing information between a semantic network stored in a memory of a first computer system and a knowledge sharing repository, comprising:
   retrieving, from the semantic network, a set of data based on information included in the semantic network;
   accessing the knowledge sharing repository from the first computer system; and
   transferring, from the first computer system, the set of data to a computer system hosting the knowledge sharing repository for incorporation into the knowledge sharing repository.

2. The method of claim 1 wherein said accessing the knowledge sharing repository comprises inserting a name of an entity into a URL or other access protocol for accessing a template infobox for a desired page of the knowledge sharing repository.

3. The method of claim 2 wherein said incorporating comprises updating the page of the knowledge sharing repository associated with the URL based, at least in part, on the set of data.

4. The method of claim 1 wherein said accessing the knowledge sharing repository comprises inserting a name of an entity into a URL or other access protocol for accessing an infobox for a desired page of the knowledge sharing repository.

5. The method of claim 4 wherein said incorporating comprises updating the page of the knowledge sharing repository associated with the URL based, at least in part, on the set of data.

6. The method of claim 1 wherein said retrieving comprises:
   accessing an infobox for a knowledge sharing repository page; and
   retrieving, as at least a portion of the set of data, at least a portion of the contents of the infobox.

7. The method of claim 1 wherein said retrieving includes translating a knowledge structure template-related cluster of triplets into knowledge sharing repository template infobox content.

8. A computer readable medium including processor executable instructions for sharing information between a semantic network and a knowledge sharing repository, including instructions to:
   retrieve from the semantic network, a set of data based on information included in the semantic network;
   access the knowledge sharing repository from a first computer system; and
   transfer, from the first computer system, the set of data to a computer system hosting the knowledge sharing repository for incorporation into the knowledge sharing repository.

9. The computer readable medium of claim 8 wherein the instructions to access the knowledge sharing repository comprise instructions to insert a name of an entity into a URL or other access protocol for accessing a template infobox for a desired page of the knowledge sharing repository.

10. The computer readable medium of claim 9 herein the instructions include instructions to update the page of the knowledge sharing repository associated with the URL based, at least in part, on the set of data.

11. The computer readable medium of claim 8 wherein the instructions to access the knowledge sharing repository include instructions to insert a name of an entity into a URL or other access protocol for accessing an infobox for a desired page of the knowledge sharing repository.

12. The computer readable medium of claim 11 wherein the instructions include instructions to update the page of the knowledge sharing repository associated with the URL based, at least in part, on the set of data.

13. The computer readable medium of claim 8 wherein the instructions to retrieve the set of data include instructions to:
   access an infobox for a knowledge sharing repository page; and
   retrieve, as at least a portion of said data, at least a portion of the contents of the infobox.

14. The computer readable medium of claim 8 wherein the instructions to retrieve the set of data include instructions to translate a knowledge structure template-related cluster of triplets into knowledge sharing repository template infobox content.

15. The method of claim 1 wherein;
   said retrieving comprises generating a text summary of at least a portion of the set of data; and
   said transferring comprises inserting the text summary into a page of the knowledge sharing repository.

16. The method of claim 1 wherein:
   said retrieving comprises generating a text summary of at least a portion of the set of data for a selected named entity; and
   said transferring comprises inserting the text summary into a page of the knowledge sharing repository corresponding to said selected named entity.

17. The method of claim 1 wherein:
   said retrieving comprises extracting a content document comprising at least a portion of the set of data; and
   said transferring comprises inserting the content document into a page of the knowledge sharing repository.

18. The method of claim 1 wherein:
   said retrieving comprises extracting one or more attachments or other documents associated with a selected entity comprising at least a portion of the set of data; and
   said transferring comprises at least one of inserting and linking said associated attachments or documents into an infobox of a page of the knowledge sharing repository corresponding to the selected entity.

19. The method of claim 1 wherein:
   said retrieving comprises generating at least one related entity section from at least a portion of the set of data, the related entity section being associated with a second entity related to a first entity; and
   said transferring comprises inserting the at least one related entity section into a related entities section of a page of the knowledge sharing repository associated with the first entity.

20. The method of claim 1 wherein:
   said retrieving comprises extracting at least one of attachments, links, and other references to documents associated with a selected entity comprising at least a portion of the set of data; and
   said transferring comprises at least one of inserting and linking said associated documents into a related entities section of a page of the knowledge sharing repository corresponding to the selected entity.

21. The method of claim 1 wherein said transferring comprises snapping at least a portion of an ontology of the semantic network to categories of the knowledge sharing repository and generating one or more new corresponding category pages in the knowledge sharing repository.

22. The method of claim 1 wherein:
   said retrieving comprises generating an assignment of element types to elements in a knowledge structure template-related triplet; and
   said transferring comprises inserting a tagged representation of the triplet as text in a page of the knowledge sharing repository.

23. The method of claim 22 wherein said tagged representation of the triplet includes other knowledge structure content chosen from the group consisting of properties, provenance, pedigree, icons, pictures and documents.

24. The method of claim 1 wherein:
   said retrieving comprises retrieving at least a portion of a semantic network knowledge structure; and
   said transferring comprises inserting the at least a portion of the semantic network knowledge structure into at least one page of the knowledge sharing repository.

25. The computer readable medium of claim 8 wherein:
   the instructions to retrieve the set of data include instructions to generate a text summary of at least a portion of the set of data; and
   the instructions to transfer the set of data include instructions to insert the text summary into a page of the knowledge sharing repository.

26. The computer readable medium of claim 8 wherein:
   the instructions to retrieve the set of data include instructions to generate a text summary of at least a portion of the set of data for a selected named entity; and
   the instructions to transfer the set of data include instructions to insert the text summary into a page of the knowledge sharing repository corresponding to said selected named entity.

27. The computer readable medium of claim 8 wherein:
the instructions to retrieve the set of data include instructions to extract a content document comprising at least a portion of the set of data; and
the instructions to transfer the set of data include instructions to insert the content document into a page of the knowledge sharing repository.

28. The computer readable medium of claim 8 wherein:
the instructions to retrieve the set of data include instructions to extract one or more attachments or other documents associated with a selected entity comprising at least a portion of the set of data; and
the instructions to transfer the set of data include instructions to insert and/or link at least one of said associated attachments and documents into an infobox of a page of the knowledge sharing repository corresponding to said selected entity.

29. The computer readable medium of claim 8 wherein:
the instructions to retrieve the set of data include instructions to generate at least one related entity section from at least a portion of the set of data, the related entity section being associated with a second entity related to a first entity; and
the instructions to transfer the set of data include instructions to insert the at least one related entity section into a related entities section of a page of the knowledge sharing repository associated with the first entity.

30. The computer readable medium of claim 8 wherein:
the instructions to retrieve the set of data include instructions to extract at least one of attachments, links, and other references to documents associated with a selected entity comprising at least a portion of the set of data; and
the instructions to transfer the set of data include instructions to insert and/or link said associated documents into a related entities section of a page of the knowledge sharing repository corresponding to said selected entity.

31. The computer readable medium of claim 8 wherein the instructions to transfer the set of data include instructions to:
map at least a portion of an ontology of the semantic network to categories of the knowledge sharing repository, and
generate one or more new corresponding category pages in the knowledge sharing repository.

32. The computer readable medium of claim 8 wherein:
the instructions to retrieve the set of data include instructions to generate an assignment of element types to elements in a knowledge structure template-related triplet; and
the instructions to transfer the set of data include instructions to insert a tagged representation of the triplet as text in a page of the knowledge sharing repository.

33. The computer readable medium of claim 32 wherein said tagged representation of the triplet includes other knowledge structure content chosen from the group consisting of properties, provenance, pedigree, icons, pictures and documents.

34. The computer readable medium of claim 8 wherein:
the instructions to retrieve the set of data include instructions to retrieve at least a portion of a semantic network knowledge structure; and
the instructions to transfer the set of data include instructions to insert the at least a portion of the semantic network knowledge structure into at least one page of the knowledge sharing repository.

35. A computer implemented method of sharing information between a semantic network stored in a memory of a first computer system and a knowledge sharing repository, comprising:
accessing the knowledge sharing repository from the first computer system;
retrieving, from the knowledge sharing repository, a set of data based on information included in the knowledge sharing repository; and
transferring, from the first computer system, the set of data to a computer system hosting the semantic network for incorporation into the semantic network.

36. The method of claim 35 wherein said transferring comprises translating at least a portion of a related entities section of a page of the knowledge sharing repository to an associated knowledge object in the semantic network.

37. The method of claim 35 wherein said transferring comprises mapping categories of the knowledge sharing repository into corresponding element types in an ontology of the semantic network and inserting portions of the set of data into the corresponding elements.

38. The method of claim 35 wherein said transferring comprises translating unstructured knowledge sharing repository pages into knowledge structure content of the semantic network.

39. The method of claim 35 wherein said transferring comprises extracting tagged representations of content from the knowledge sharing repository and translating the tagged representations into content for insertion in the semantic network.

40. A computer readable medium including processor executable instructions for sharing information between a semantic network and a knowledge sharing repository, including instructions to:
access the knowledge sharing repository from the first computer system;
retrieve, from the knowledge sharing repository, a set of data based on information included in the knowledge sharing repository; and
transfer, from the first computer system, the set of data to a computer system hosting the semantic network for incorporation into the semantic network.

41. The computer readable medium of claim 40 wherein the instructions to transfer the set of data include instructions to translate at least a portion of a related entities section of a page of the knowledge sharing repository to an associated knowledge object in the semantic network.

42. The computer readable medium of claim 40 wherein the instructions to transfer the set of data include instructions to map categories of the knowledge sharing repository into corresponding elements in an ontology of the semantic network and insert portions of the set of data into the corresponding elements.

43. The computer readable medium of claim 40 wherein the instructions to transfer the set of data include instructions to translate unstructured knowledge sharing repository pages into knowledge structure content of the semantic network.

44. The computer readable medium of claim 40 wherein the instructions to transfer the set of data include instructions to extract tagged representations of content from the knowledge sharing repository and translate the tagged representations into content for insertion in the semantic network.

* * * * *